(12) United States Patent
Thomas

(10) Patent No.: US 10,456,708 B2
(45) Date of Patent: Oct. 29, 2019

(54) METHOD AND APPARATUS FOR EXTRACTING BOTANICAL OILS

(71) Applicant: Natural Extraction Systems, LLC, Boulder, CO (US)

(72) Inventor: C. Russell Thomas, Boulder, CO (US)

(73) Assignee: Natural Extraction Systems, LLC, Boulder, CO (US)

(*) Notice: Subject to any disclaimer, the term of this patent is extended or adjusted under 35 U.S.C. 154(b) by 0 days.

(21) Appl. No.: 16/184,574

(22) Filed: Nov. 8, 2018

(65) Prior Publication Data

US 2019/0076753 A1    Mar. 14, 2019

Related U.S. Application Data

(60) Division of application No. 15/090,143, filed on Apr. 4, 2016, now Pat. No. 10,159,908, which is a continuation of application No. PCT/IB2014/002383, filed on Oct. 6, 2014.

(60) Provisional application No. 61/886,908, filed on Oct. 4, 2013.

(51) Int. Cl.
| | |
|---|---|
| *B01D 11/02* | (2006.01) |
| *B01D 1/14* | (2006.01) |
| *B01D 3/34* | (2006.01) |
| *C11B 1/10* | (2006.01) |
| *C11B 9/02* | (2006.01) |
| *B01D 11/00* | (2006.01) |

(52) U.S. Cl.
CPC ............ *B01D 11/02* (2013.01); *B01D 1/14* (2013.01); *B01D 3/343* (2013.01); *B01D 11/023* (2013.01); *B01D 11/028* (2013.01); *B01D 11/0288* (2013.01); *B01D 11/0296* (2013.01); *C11B 1/10* (2013.01); *C11B 9/027* (2013.01); *B01D 2011/007* (2013.01)

(58) Field of Classification Search
CPC .. B01D 11/02; B01D 1/14; C11B 1/10; C11B 9/027
USPC .......................................................... 554/8
See application file for complete search history.

(56) References Cited

U.S. PATENT DOCUMENTS

| | | |
|---|---|---|
| 2,467,435 A | 4/1949 | Langhurst |
| 2,805,981 A | 9/1957 | Cavin et al. |
| 3,270,437 A | 9/1966 | Lara et al. |
| 4,227,997 A | 10/1980 | Shaddock |
| 4,279,824 A | 7/1981 | McKinney |
| 4,396,487 A | 8/1983 | Strumskis |
| 4,752,307 A | 6/1988 | Asmus et al. |
| 5,026,549 A | 6/1991 | Coutiere |
| 5,235,992 A | 8/1993 | Sensabaugh, Jr. |
| 5,408,924 A | 4/1995 | Arendt et al. |
| 6,019,819 A | 2/2000 | Williams |

(Continued)

FOREIGN PATENT DOCUMENTS

| | | |
|---|---|---|
| CN | 201643760 U | * 11/2010 |
| CN | 101553702 B | 6/2012 |

(Continued)

*Primary Examiner* — Deborah D Carr
(74) *Attorney, Agent, or Firm* — Dinsmore & Shohl LLP

(57) ABSTRACT

An apparatus for extracting an oil from plant material includes an extraction chamber for plant material. The plant material is exposed to a heated gas stream with a temperature sufficient to volatilize on oil from the plant material. The gas stream is rapidly cooled to liquefy the oil into entrained droplets. The oil is collected with a collection solvent.

20 Claims, 26 Drawing Sheets

(56) References Cited

U.S. PATENT DOCUMENTS

| | | |
|---|---|---|
| 6,248,910 B1 | 6/2001 | Franke |
| 6,403,126 B1 | 6/2002 | Webster et al. |
| 6,860,998 B1 | 3/2005 | Wilde |
| 7,001,502 B1 | 2/2006 | Satchwell et al. |
| 7,344,736 B2 | 3/2008 | Whittle et al. |
| 7,622,140 B2 | 11/2009 | Whittle et al. |
| 7,833,298 B2 | 11/2010 | Larnholm et al. |
| 8,062,410 B2 | 11/2011 | Bullinger et al. |
| 8,329,229 B2 | 12/2012 | Gonzalez et al. |
| 8,343,553 B2 | 1/2013 | Hospodor |
| 8,445,034 B1 | 5/2013 | Coles, Jr. |
| 9,038,413 B2 | 5/2015 | Howard et al. |
| 2002/0139097 A1 | 10/2002 | Brilmaker |
| 2004/0049059 A1 | 3/2004 | Mueller |
| 2004/0147767 A1 | 7/2004 | Whittle et al. |
| 2004/0147769 A1 | 7/2004 | Davis |
| 2005/0172802 A1 | 8/2005 | Betting et al. |
| 2009/0054711 A1 | 2/2009 | Lawrence et al. |
| 2010/0119606 A1 | 5/2010 | Whittle et al. |
| 2011/0133120 A1 | 6/2011 | McGhee |
| 2013/0240347 A1 | 9/2013 | Hackleman et al. |
| 2014/0001027 A1 | 1/2014 | Balass |
| 2014/0113010 A1 | 4/2014 | Hospodor et al. |
| 2014/0193303 A1 | 7/2014 | Ellis et al. |
| 2015/0252286 A1 | 9/2015 | Scialdone et al. |

FOREIGN PATENT DOCUMENTS

| | | |
|---|---|---|
| EP | 2644039 A1 | 10/2013 |
| GB | 635121 | 10/1945 |
| JP | 4388715 | 11/2002 |
| JP | 4388715 B2 * | 12/2009 |
| JP | 4849578 B1 | 1/2012 |
| WO | WO-2014/000077 A1 | 1/2014 |
| WO | WO2015/049585 | 4/2015 |

* cited by examiner

METHOD AND APPARATUS FOR EXTRACTING BOTANICAL OILS

REFERENCE TO RELATED APPLICATIONS

This application is a divisional of U.S. patent application Ser. No. 15/090,143, filed Apr. 4, 2016, which is a continuation of International Application No. PCT/IB2014/002383, filed Oct. 6, 2014, which claims priority to U.S. Provisional Patent Application Ser. No. 61/886,908, filed Oct. 4, 2013, the entire content of each of which is hereby incorporated by reference.

FIELD OF THE INVENTION

The present invention relates generally to methods and apparatuses for extracting oil from plant materials.

BACKGROUND OF THE INVENTION

Traditional methods of extracting oils from plants often utilize industrial solvents that are not safe for human consumption or cosmetic use. While organic or otherwise safe processes are available, such processes can be slow and expensive and will often extract unwanted plant constituents such as sugars and chlorophyll. Such unwanted constituents can compromise the purity, smell and taste of the desired oils, even leading to potential ailments if consumed.

SUMMARY OF THE INVENTION

The present invention provides several embodiments of a method and apparatus for the extraction of oils, saps, resins, oleoresins, lipids, terpinoids or otherwise volatilizable constituents (generically referred to in this disclosure as "oils" or "plant oils") from plant materials. Some embodiments provide an extraction method that is fast, effective, and inexpensive and only extracts the desired oils, yielding an extract of high purity that is safe for human consumption or cosmetic use.

Certain embodiments of the present invention utilize a heated air or gas-assisted distillation method to rapidly distill plant oils from plant materials in a way that is fast enough to reduce breakdown of the plant oils due to the heat used during distillation. In some embodiments of the method, temperature-regulated heated air or gas (the "gas stream") is driven through or around a container of plant material, which quickly causes certain oils to volatize and be driven from the plant material in the form of a vapor. The volatilized oils become entrained in the gas stream which is then rapidly cooled with a spray consisting of one or more solvents, water or a mixture of such (the "collection solvent"). Some of the cooled plant oil vapor immediately condenses on the surface of the collection solvent droplets and dissolves in the collection solvent, where it is captured, while the remaining cooled plant oil vapor condenses to liquid droplets of plant oil that continue through the system and pass through a number of primary droplet separation steps. The primary droplet separation steps may include centrifugal devices, filtration devices and/or a plurality of solvent sprayers within a collection chamber that emit solvent droplets that impact and capture the plant oil droplets. The primary droplet separation steps are aided by one or more solvent-vapor supersaturated agglomeration chambers that grow the size of the condensing plant oil droplets by exposing them to a gas stream that has been supersaturated with collection solvent vapor. In the supersaturated environment, the collection solvent vapors condense on the surface of the plant oil droplets causing the droplets to increase in size and mass, thereby facilitating their effective removal from the gas stream through the primary droplet separation steps. Any oil vapor or condensed oil droplets that are not captured on the first pass through the collection system may recirculate through the system until the gas stream is purified and all of the plant oil is captured in the collection solvent. The collection solvent may be purified either continuously or intermittently using a temperature-regulated secondary distillation process that may optionally be facilitated with the aid of a vacuum. The purified solvent may be reintroduced either continuously or intermittently to the internal parts of the system in the form of a spray or vapor. As the purified collection solvent is reintroduced, it further aids in the separation of the oil from the gas stream, while simultaneously condensing on the internal surfaces of the system and acting to wash any oils that have accumulated on such surfaces. The plant oil is simultaneously separated from the collection solvent during the purification process and becomes concentrated in the secondary distillation vessel. The separated plant oils are removed from the system when the desired concentration or volume has been attained.

An embodiment of the present invention provides a system for extracting an oil from plant material. The system includes a gas moving device operable to propel a gas stream through the system, the gas stream being a stream of air or gas with or without entrained vapor, solids or droplets of liquid therein. A heater is disposed such that the gas stream flows through the heater, and the heater is operable to heat the gas stream to a temperature sufficient to cause volatilization of an oil to be extracted. An extraction chamber has a receiving area for receiving plant material for extraction, the extraction chamber in communication with the heater such that the heated gas stream is directed through the receiving area, and the heated gas stream volatizes the oil from the plant material such that the volatilized oil is disposed in the heated gas stream. A collection chamber is in communication with the extraction chamber such that that the gas stream flows through the collection chamber, and the collection chamber has collection solvent operable to collect at least a portion of the extracted oil from the gas stream. A liquid collector is in fluid communication with a lower area of the collection chamber for collecting at least a portion of the collection solvent and extracted oil.

In some versions, the collection chamber has at least one collection solvent sprayer operable to spray droplets of collection solvent into the gas stream such that at least some of the extracted oil dissolves into the collection solvent droplets and at least some of the collection solvent droplets flow to a lower area of the collection chamber. The collection chamber may be an elongated passage and the at least one collection solvent sprayer may be a plurality of collection solvent sprayers. The sprayers in the collection chamber may emit droplets that generally have a diameter greater than one micron and less than 300 microns.

In some versions, the system includes a cooling chamber in communication with the extraction chamber such that the heated gas stream flows through the cooling chamber. The cooling chamber is operable to cool the heated gas stream to or below a volatilization temperature of the oil such that the oil liquefies into droplets entrained in the gas stream, the collection chamber being downstream of the cooling chamber. The gas moving device may be disposed between the cooling chamber and the collection chamber and the system is a closed loop system. In some versions, the cooling chamber is a spray cooling chamber having a high pressure sprayer operable to spray collection solvent into the heated gas stream such that the collection solvent rapidly cools the heated gas stream to or below a condensation temperature of the oil.

In some versions, the collection chamber has packing material disposed therein such that the packing material is wetted by the collection solvent. The packing material may be selected from random packing including raschig rings, saddles and beads and structured packing including knitted packing, woven wire mesh, stainless steel wool, stainless steel matting, woven stainless steel mesh, corrugated metal sections, bubble-cap plates and sieve tray plates.

In some versions, the system includes an agglomeration chamber in communication with the cooling chamber or extraction chamber so as to receive the gas stream, the agglomeration chamber slowing the gas stream such that droplet size in the gas stream may increase, the agglomeration chamber having an outlet in communication with the inlet of the gas moving device. The agglomeration chamber may have baffles disposed therein.

In some versions, the system includes a gas stream mixer having a first gas inlet in communication with the extraction chamber so as to receive the gas stream, the gas stream being a first gas stream, the gas stream mixer further having a second gas inlet receiving a second gas stream having a temperature less than the temperature of the first gas stream. The gas moving device may be disposed between the gas stream mixer and the heater.

In some versions, passages or chambers are disposed downstream of the spray cooling chamber or the collection chamber, the passages or chambers having surfaces with a temperature less than a condensation temperature of the collection solvent such that collection solvent vapor entrained in the gas stream condenses on the surfaces and forms a substantially purified solvent liquid that washes accumulated oils and collection solvent containing dissolved oils from these surfaces, the combined liquid flowing down the surfaces to the liquid collector. The collection surfaces may include inner surfaces of outer walls of the passages or chambers, the outer walls being exposed to ambient air.

In some versions, the extraction chamber includes a housing having an access cover providing access to an interior of the housing and a removable container received in the interior of the housing, the container having an open upper end and a perforated bottom, the removable container defining the receiving area and the plant materials being supported on the perforated bottom. The housing of the extraction chamber may be generally cylindrical and have a tangential inlet for receiving the heated first gas stream portion. The removable container may be generally cylindrical and spaced from the housing such that the heated gas stream swirls around in the space between the container and housing, through the open top of the container, through the plant materials and through the perforated bottom, and the extraction chamber has an exit cone connected to the bottom of the container that defines an outlet for the heated first gas stream.

In some versions, the extraction chamber includes a conveyor element operable to convey plant material into the receiving area for extraction and out of the receiving area for disposal. The conveyor element may be a conveyor disk, the conveyor disk being perforated such that the heated gas stream passes through the conveyor disk. Alternatively, the conveyor element may be a conveyor belt, the conveyor belt being perforated such that the heated gas stream passes through the conveyor belt.

In some versions, the extraction chamber includes a housing having a plurality of inlets and a plurality of outlets, the housing defining an interior area. A conveyor disk is supported in the interior of the housing and rotatable about a disk axis. The plurality of inlets and outlets a plant material supply inlet for receiving plant materials onto the conveyor disk, an extraction gas inlet for receiving the heated gas stream and directing the heated gas stream to an extraction area, an extraction gas outlet for receiving the heated gas stream from the extraction area, and a plant material removal outlet for receiving plant materials from the conveyor disk after extraction for removal. The conveyor disk rotates about the disk axis such that plant materials received through the plant material inlet are moved to the extraction area and exposed to the heated gas stream and are then moved to a position such that the plant materials after extraction are removed through the plant material outlet. The plurality of inlets and outlets may also include a plant material removal inlet generally aligned with the plant material removal outlet with a portion of the conveyor disk disposed therebetween, a flow of gas being provided through the plant material removal inlet so as to carry the plant material after extraction off the conveyor disk and out the plant material removal outlet. The plurality of inlets and outlets may also include a plant material supply outlet generally aligned with the plant material supply inlet with a portion of the conveyor disk disposed therebetween, a flow of gas being provided through the plant material supply inlet so as to carry the plant material to the conveyor disk, the flow of gas flowing out the plant material supply outlet. The conveyor disk may be a perforated disk having a plant material receiving surface with partitions defined thereon. The conveyor disk may be generally horizontal in a use position. The plurality of inlets and outlets may also include a secondary extraction gas inlet for receiving a heated secondary gas stream and directing the heated secondary gas stream to a secondary extraction area and a secondary extraction gas outlet for receiving the heated secondary gas stream from the secondary extraction area, with the conveyor disk rotating about the disk axis such that plant materials are moved from the extraction area to the secondary extraction area and then moved to the position such that the plant materials after extraction are removed through the plant material outlet.

In some versions, the system also includes an oil/solvent separation system operable to generally separate the collection solvent from the extracted oil so as to provide a generally purified collection solvent and a generally purified oil. The oil/solvent separation system may be a distillation system such as a vacuum distillation system.

In some versions, the collection solvent is a mixture of ethyl alcohol and water. The collection solvent may contain at least 40% ethyl alcohol and/or the ethyl alcohol may be organic ethyl alcohol.

In some versions, the extracted oil is soluble in the collection solvent and at least a portion of the volatized oil is dissolved into the collection solvent in the system.

In some versions, the plant materials are raw plant portions or partially processed plant portions. The plant materials may be partially processed plant portions disposed on a substrate.

In some versions, the heater is operable to heat the gas stream to a temperature at or above a temperature 100 degrees Celsius below a volatilization temperature of the oil to be extracted and the spray of collection solvent in the spray cooling chamber cools the heated gas stream to a temperature that is at or below a condensation temperature of the oil to be extracted or below the temperature of the gas stream exiting the extraction chamber within 5 seconds after the gas stream exits the extraction chamber. The heater may be operable to heat the gas stream to a temperature greater than 100 degrees Celsius and lower than 270 degrees Celsius. The heater may be operable to heat the gas stream to a temperature at or above the volatilization temperature of the oil.

In some versions, the collection solvent is a non-toxic, food-grade solvent.

In some versions, the gas moving device is a blower.

Another embodiment of a system for extracting an oil from plant material includes a gas moving device having an inlet and an outlet, the gas moving device operable to propel a gas stream from the inlet to the outlet, the gas stream being a stream of air or gas with or without entrained vapor, solids or droplets of liquid therein. A heater is in communication with the gas moving device such that the gas stream flows through the heater, the heater being operable to heat the gas stream to a temperature sufficient to cause volatilization of an oil to be extracted. An extraction chamber has a receiving area for receiving plant material for extraction, the extraction chamber being in communication with the heater such that the heated gas stream is directed through the receiving area, the heated gas stream volatizing the oil from the plant material such that the volatilized oil is disposed in the heated gas stream. A spray cooling chamber is in communication with the extraction chamber such that the heated gas stream flows through the cooling chamber, the spray cooling chamber having a sprayer operable to spray a collection solvent into the heated gas stream such that the collection solvent rapidly cools the heated gas stream to or below a volatilization temperature of the oil such that the oil liquefies into droplets entrained in the gas stream. A liquid collector collects at least a portion of the collection solvent and extracted oil, and a liquid pump is operable to pump a portion of the collection solvent from the liquid collector to the sprayer in the spray cooling chamber.

In some versions, the inlet of the gas moving device receives the gas stream from the spray cooling chamber and the system is a closed loop system.

In some versions, the system also includes a collection chamber in communication with the cooling chamber such that that the gas stream with entrained droplets flows through the collection chamber. The collection chamber has at least one collection solvent sprayer operable to spray droplets of collection solvent into the gas stream such that at least some of the entrained oil droplets dissolve into the collection solvent droplets and at least some of the collection solvent droplets flow to a lower area of the collection chamber. The gas moving device may be disposed between the cooling chamber and the collection chamber.

The liquid collector may be in fluid communication with the collection chamber and/or the collection chamber may have packing material disposed therein such that the packing material is wetted by the collection solvent. Alternatively, packing material may be disposed in the system such that the gas stream flows through the packing material, and the packing material is wetted with a collection solvent. The packing material may be selected from random packing including raschig rings, saddles and beads and structured packing including knitted packing, woven wire mesh, stainless steel wool, stainless steel matting, woven stainless steel mesh, corrugated metal sections, bubble-cap plates and sieve tray plates.

The sprayers in the collection chamber may emit droplets that generally have a diameter greater than one micron and less than 300 microns.

In some versions, the system also includes a mixer disposed between the extraction chamber and the spray cooling chamber, the mixer operable to mix a flow of cooler gas with the gas stream prior to the gas stream entering the spray cooling chamber.

In some versions, the system also includes an agglomeration chamber in communication with the spray cooling chamber so as to receive the gas stream, the agglomeration chamber slowing the gas stream such that droplet size in the gas stream may increase, and the agglomeration chamber has an outlet in communication with the inlet of the gas moving device. The agglomeration chamber may have baffles disposed therein.

In some versions, the system includes a gas stream mixer having a first gas inlet in communication with the extraction chamber so as to receive the gas stream, the gas stream being a first gas stream, the gas stream mixer further having a second gas inlet receiving a second gas stream having a temperature less than the temperature of the first gas stream. The gas moving device may be disposed between the gas stream mixer and the heater.

In some versions, passages or chambers are disposed downstream of the spray cooling chamber or the collection chamber, the passages or chambers having surfaces with a temperature less than a condensation temperature of the collection solvent such that collection solvent vapor entrained in the gas stream condenses on the surfaces and forms a substantially purified solvent liquid that washes accumulated oils and collection solvent containing dissolved oils from these surfaces, the combined liquid flowing down the surfaces to the liquid collector. The collection surfaces may include inner surfaces of outer walls of the passages or chambers, the outer walls being exposed to ambient air.

In some versions, the extraction chamber includes a conveyor element operable to convey plant material into the receiving area for extraction and out of the receiving area for disposal. The conveyor element may be a conveyor disk, the conveyor disk being perforated such that the heated gas stream passes through the conveyor disk. Alternatively, the conveyor element may be a conveyor belt, the conveyor belt being perforated such that the heated gas stream passes through the conveyor belt.

In some versions, the extraction chamber includes a housing having a plurality of inlets and a plurality of outlets, the housing defining an interior area. A conveyor disk is supported in the interior of the housing and rotatable about a disk axis. The plurality of inlets and outlets a plant material supply inlet for receiving plant materials onto the conveyor disk, an extraction gas inlet for receiving the heated gas stream and directing the heated gas stream to an extraction area, an extraction gas outlet for receiving the heated gas stream from the extraction area, and a plant material removal outlet for receiving plant materials from the conveyor disk after extraction for removal. The conveyor disk rotates about the disk axis such that plant materials received through the plant material inlet are moved to the extraction area and exposed to the heated gas stream and are then moved to a position such that the plant materials after extraction are removed through the plant material outlet. The plurality of inlets and outlets may also include a plant material removal inlet generally aligned with the plant material removal outlet with a portion of the conveyor disk disposed therebetween, a flow of gas being provided through the plant material removal inlet so as to carry the plant material after extraction off the conveyor disk and out the plant material removal outlet. The plurality of inlets and outlets may also include a plant material supply outlet generally aligned with the plant material supply inlet with a portion of the conveyor disk disposed therebetween, a flow of gas being provided through the plant material supply inlet so as to carry the plant material to the conveyor disk, the flow of gas flowing out the plant material supply outlet. The conveyor disk may be a perforated disk having a plant material receiving surface with partitions defined thereon. The conveyor disk may be generally horizontal in a use position. The plurality of inlets and outlets may also include a secondary extraction gas inlet for receiving a heated secondary gas stream and directing the heated secondary gas stream to a secondary extraction area and a secondary extraction gas outlet for receiving the heated secondary gas stream from the secondary extraction area, with the conveyor disk rotating about the disk axis such that plant materials are moved from the extraction area to the secondary extraction area and then moved to the position such that the plant materials after extraction are removed through the plant material outlet.

In some versions, the system also includes an oil/solvent separation system operable to generally separate the collection solvent from the extracted oil so as to provide a generally purified collection solvent and a generally purified oil. The oil/solvent separation system may be a distillation system such as a vacuum distillation system.

In some versions, the collection solvent is a mixture of ethyl alcohol and water. The collection solvent may contain at least 40% ethyl alcohol and/or the ethyl alcohol may be organic ethyl alcohol.

In some versions, the extracted oil is soluble in the collection solvent and at least a portion of the volatized oil is dissolved into the collection solvent in the system.

In some versions, the plant materials are raw plant portions or partially processed plant portions. The plant materials may be partially processed plant portions disposed on a substrate.

In some versions, the heater is operable to heat the gas stream to a temperature at or above a temperature 100 degrees Celsius below a volatilization temperature of the oil to be extracted and the spray of collection solvent in the spray cooling chamber cools the heated gas stream to a temperature that is at or below a condensation temperature of the oil to be extracted or below the temperature of the gas stream exiting the extraction chamber within 5 seconds after the gas stream exits the extraction chamber. The heater may be operable to heat the gas stream to a temperature greater than 100 degrees Celsius and lower than 270 degrees Celsius. The heater may be operable to heat the gas stream to a temperature at or above the volatilization temperature of the oil.

In some versions, the collection solvent is a non-toxic, food-grade solvent.

In some versions, the gas moving device is a blower.

Another embodiment of a system for extracting an oil from plant material includes a gas moving device having an inlet and an outlet, the gas moving device operable to propel an aggregate gas stream from the inlet to the outlet, the aggregate gas stream being a stream of air or gas with or without entrained vapor, solids or droplets of liquid therein. A gas stream splitter has an inlet in communication with the outlet of the gas moving device such that the aggregate gas stream from the gas moving device flows into the gas stream splitter. The gas stream splitter has a first gas outlet and a second gas outlet and is operable to divide the aggregate gas stream into a first gas stream portion through the first gas outlet and a second gas stream portion through the second gas outlet. A heater is in communication with the gas stream splitter such that the first gas stream portion flows through the heater and the heater is operable to heat the first gas stream portion to a temperature sufficient to cause volatilization of an oil to be extracted. An extraction chamber has a receiving area for receiving plant material for extraction, the extraction chamber being in communication with the heater such that the heated first gas stream portion is directed through the receiving area. The heated first gas stream portion volatizes the oil from the plant material such that the volatilized oil is disposed in the heated first gas stream portion. A cooling chamber is in communication with the extraction chamber such that the heated first gas stream portion flows through the cooling chamber, the cooling chamber operable to cool the heated first gas stream portion to or below a condensation temperature of the oil such that the oil liquefies into droplets entrained in the gas stream. A gas stream mixer has a first gas inlet in communication with the cooling chamber so as to receive the first gas stream portion and a second gas inlet in communication with the gas stream splitter so as to receive the second gas stream portion, the gas stream mixer operable to combine the first and second gas stream portions into the aggregate gas stream. The second gas stream has a temperature less than the temperature of the first gas stream. The inlet of the gas moving device receives the aggregate gas stream from the gas stream mixer for recirculation of the gas stream.

In some versions, the system also includes a cooling tower disposed between the second gas outlet of the gas stream splitter and the gas stream mixer such that the second gas stream portion from the second gas outlet flows through the cooling tower, the cooling tower being operable to cool the second gas stream portion as it flows through the cooling tower.

In some versions, the system also includes a collection chamber disposed between the cooling chamber and the heater such that at least some of the gas stream with entrained droplets flows through the collection chamber, the collection chamber having at least one collection solvent sprayer operable to spray droplets of collection solvent into the gas stream such that at least some of the entrained oil droplets are captured by the collection solvent droplets and at least some of the collection solvent droplets flow to a lower area of the collection chamber. The sprayer in the collection chamber may emit droplets that generally have a diameter greater than one micron and less than 300 microns. The gas moving device may be disposed between the cooling chamber and the collection chamber. The gas stream splitter may be disposed between the gas moving device and the collection chamber, and the collection chamber may be disposed between the first gas outlet of the gas stream splitter and the heater such that the first gas stream portion flows through the collection chamber.

In some versions, the system also includes a liquid collector in fluid communication with the collection chamber and a liquid pump operable to pump collection solvent from the liquid collector.

In some versions, the collection chamber has packing material disposed therein such that the packing material is wetted by the collection solvent. The packing material may be selected from random packing including raschig rings, saddles and beads and structured packing including knitted packing, woven wire mesh, stainless steel wool, stainless steel matting, woven stainless steel mesh, corrugated metal sections, bubble-cap plates and sieve tray plates In some versions, the system also includes a gas/liquid separator having an inlet, a gas outlet, and a liquid outlet, the inlet connected to the collection chamber, the gas/liquid separator operable to separate at least a portion of the liquid from the gas stream and direct the portion of the liquid to the liquid outlet. A demister may be connected to the gas outlet of the gas/liquid separator such that the first gas stream portion flows through the demister, the demister operable to remove droplets of liquid from the first gas stream portion.

In some versions, the collection chamber is an elongated passage and the at least one collection solvent sprayer is a plurality of collection solvent sprayers.

In some versions, the system also includes an agglomeration chamber in communication with the cooling chamber so as to receive the gas stream, the agglomeration chamber slowing the gas stream such that droplet size in the gas stream may increase, the agglomeration chamber having an outlet in communication with the inlet of the gas moving device. The agglomeration chamber may have baffles disposed therein.

In some versions, the cooling chamber is a spray cooling chamber having a high pressure sprayer operable to spray collection solvent into the heated gas stream such that the collection solvent rapidly cools the heated gas stream to or below a condensation temperature of the oil.

In some versions, passages or chambers are disposed downstream of the spray cooling chamber, the passages or chambers having surfaces with a temperature less than a condensation temperature of the collection solvent such that collection solvent vapor entrained in the gas stream condenses on the surfaces and forms a substantially purified solvent liquid that washes accumulated oils and collection solvent containing dissolved oils from these surfaces, the combined liquid flowing down the surfaces to the liquid collector. The collection surfaces may include inner surfaces of outer walls of the passages or chambers, the outer walls being exposed to ambient air.

In some versions, the extraction chamber includes a conveyor element operable to convey plant material into the receiving area for extraction and out of the receiving area for disposal. The conveyor element may be a conveyor disk, the conveyor disk being perforated such that the heated gas stream passes through the conveyor disk. Alternatively, the conveyor element may be a conveyor belt, the conveyor belt being perforated such that the heated gas stream passes through the conveyor belt.

In some versions, the extraction chamber includes a housing having a plurality of inlets and a plurality of outlets, the housing defining an interior area. A conveyor disk is supported in the interior of the housing and rotatable about a disk axis. The plurality of inlets and outlets a plant material supply inlet for receiving plant materials onto the conveyor disk, an extraction gas inlet for receiving the heated gas stream and directing the heated gas stream to an extraction area, an extraction gas outlet for receiving the heated gas stream from the extraction area, and a plant material removal outlet for receiving plant materials from the conveyor disk after extraction for removal. The conveyor disk rotates about the disk axis such that plant materials received through the plant material inlet are moved to the extraction area and exposed to the heated gas stream and are then moved to a position such that the plant materials after extraction are removed through the plant material outlet. The plurality of inlets and outlets may also include a plant material removal inlet generally aligned with the plant material removal outlet with a portion of the conveyor disk disposed therebetween, a flow of gas being provided through the plant material removal inlet so as to carry the plant material after extraction off the conveyor disk and out the plant material removal outlet. The plurality of inlets and outlets may also include a plant material supply outlet generally aligned with the plant material supply inlet with a portion of the conveyor disk disposed therebetween, a flow of gas being provided through the plant material supply inlet so as to carry the plant material to the conveyor disk, the flow of gas flowing out the plant material supply outlet. The conveyor disk may be a perforated disk having a plant material receiving surface with partitions defined thereon. The conveyor disk may be generally horizontal in a use position. The plurality of inlets and outlets may also include a secondary extraction gas inlet for receiving a heated secondary gas stream and directing the heated secondary gas stream to a secondary extraction area and a secondary extraction gas outlet for receiving the heated secondary gas stream from the secondary extraction area, with the conveyor disk rotating about the disk axis such that plant materials are moved from the extraction area to the secondary extraction area and then moved to the position such that the plant materials after extraction are removed through the plant material outlet.

In some versions, the system also includes an oil/solvent separation system operable to generally separate the collection solvent from the extracted oil so as to provide a generally purified collection solvent and a generally purified oil. The oil/solvent separation system may be a distillation system such as a vacuum distillation system.

In some versions, the collection solvent is a mixture of ethyl alcohol and water. The collection solvent may contain at least 40% ethyl alcohol and/or the ethyl alcohol may be organic ethyl alcohol.

In some versions, the extracted oil is soluble in the collection solvent and at least a portion of the volatized oil is dissolved into the collection solvent in the system.

In some versions, the plant materials are raw plant portions or partially processed plant portions. The plant materials may be partially processed plant portions disposed on a substrate.

In some versions, the heater is operable to heat the gas stream to a temperature at or above a temperature 100 degrees Celsius below a volatilization temperature of the oil to be extracted and the spray of collection solvent in the spray cooling chamber cools the heated gas stream to a temperature that is at or below a condensation temperature of the oil to be extracted or below the temperature of the gas stream exiting the extraction chamber within 5 seconds after the gas stream exits the extraction chamber. The heater may be operable to heat the gas stream to a temperature greater than 100 degrees Celsius and lower than 270 degrees Celsius. The heater may be operable to heat the gas stream to a temperature at or above the volatilization temperature of the oil.

In some versions, the collection solvent is a non-toxic, food-grade solvent.

In some versions, the gas moving device is a blower. In further versions, the gas stream mixer is a venturi mixer.

Another embodiment of the invention provides a system for extracting an oil from plant material which includes a gas moving device having an inlet and an outlet, the gas moving device operable to propel an aggregate gas stream from the inlet to the outlet, the aggregate gas stream being a stream of air or gas with or without entrained vapor, solids or droplets of liquid therein. A gas stream splitter has an inlet in communication with the outlet of the gas moving device such that the aggregate gas stream from the gas moving device flows into the gas stream splitter, the gas stream splitter having a first gas outlet and a second gas outlet, the gas stream splitter operable to divide the aggregate gas stream into a first gas stream portion through the first gas outlet and a second gas stream portion through the second gas outlet. A cooling tower is in communication with the second gas outlet of the gas stream splitter such that the second gas stream portion from the second gas outlet flows through the cooling tower, the cooling tower operable to cool the second gas stream portion as it flows through the cooling tower. A liquid pump is operable to pump a collection solvent. A collection chamber is connected to the first gas outlet of the gas stream splitter such that the first gas stream portion flows through the collection chamber, the collection chamber having at least one collection solvent sprayer operable to spray droplets of collection solvent into the gas stream such that at least some of the entrained oil droplets are captured by the collection solvent droplets and at least some of the collection solvent droplets flow to a lower area of the collection chamber. A gas/liquid separator has an inlet, a gas outlet, and a liquid outlet, the inlet in communication with the collection chamber such that the first gas stream portion flows through the gas/liquid separator and out the gas outlet, the gas/liquid separator operable to separate at least a portion of the liquid from the first gas stream portion and direct the portion of the liquid to the liquid outlet. A demister is in communication with the gas outlet of the gas/liquid separator such that the first gas stream portion flows through the demister, the demister operable to remove droplets of liquid from the first gas stream portion. A heater is in communication with the demister such that the first gas stream portion flows through the heater, the heater operable to heat the first gas stream portion to a temperature sufficient to cause volatilization of an oil to be extracted. An extraction chamber has a receiving area for receiving plant material for extraction, the extraction chamber being connected to the heater such that the heated first gas stream portion is directed through the receiving area, the heated first gas stream portion volatizing the oil from the plant material such that the volatilized oil is disposed in the heated first gas stream portion. A spray cooling chamber is connected to the extraction chamber such that the heated first gas stream portion flows through the cooling chamber, the cooling chamber having a high pressure sprayer in fluid communication with the liquid pump and operable to spray a collection solvent into the heated first gas stream portion such that the collection solvent rapidly cools the heated first gas stream portion to or below the volatilization temperature of the oil such that the oil liquefies into droplets entrained in the gas stream. A gas stream mixer has a first gas inlet connected to the spray cooling chamber so as to receive the first gas stream portion and a second gas inlet connected to the cooling tower so as to receive the second gas stream portion, the gas stream mixer operable to combine the first and second gas stream portions into the aggregate gas stream. The second gas stream has a temperature less than the temperature of the first gas stream. An agglomeration chamber is connected to the gas stream mixer so as to receive the aggregate gas stream, the agglomeration chamber having an outlet connected to the inlet of the gas moving device.

In some versions, the extraction chamber includes a housing having an access cover providing access to an interior of the housing.

A removable container received in the interior of the housing, the container having an open upper end and a perforated bottom, the removable container defining the receiving area and the plant materials being supported on the perforated bottom.

In some versions, passages or chambers are disposed downstream of the spray cooling chamber or the collection chamber, the passages or chambers having surfaces with a temperature less than a condensation temperature of the collection solvent such that collection solvent vapor entrained in the gas stream condenses on the surfaces and forms a substantially purified solvent liquid that washes accumulated oils and collection solvent containing dissolved oils from these surfaces, the combined liquid flowing down the surfaces to the liquid collector. The collection surfaces may include inner surfaces of outer walls of the passages or chambers, the outer walls being exposed to ambient air.

In some versions, the extraction chamber includes a conveyor element operable to convey plant material into the receiving area for extraction and out of the receiving area for disposal. The conveyor element may be a conveyor disk, the conveyor disk being perforated such that the heated gas stream passes through the conveyor disk. Alternatively, the conveyor element may be a conveyor belt, the conveyor belt being perforated such that the heated gas stream passes through the conveyor belt.

In some versions, the extraction chamber includes a housing having a plurality of inlets and a plurality of outlets, the housing defining an interior area. A conveyor disk is supported in the interior of the housing and rotatable about a disk axis. The plurality of inlets and outlets a plant material supply inlet for receiving plant materials onto the conveyor disk, an extraction gas inlet for receiving the heated gas stream and directing the heated gas stream to an extraction area, an extraction gas outlet for receiving the heated gas stream from the extraction area, and a plant material removal outlet for receiving plant materials from the conveyor disk after extraction for removal. The conveyor disk rotates about the disk axis such that plant materials received through the plant material inlet are moved to the extraction area and exposed to the heated gas stream and are then moved to a position such that the plant materials after extraction are removed through the plant material outlet. The plurality of inlets and outlets may also include a plant material removal inlet generally aligned with the plant material removal outlet with a portion of the conveyor disk disposed therebetween, a flow of gas being provided through the plant material removal inlet so as to carry the plant material after extraction off the conveyor disk and out the plant material removal outlet. The plurality of inlets and outlets may also include a plant material supply outlet generally aligned with the plant material supply inlet with a portion of the conveyor disk disposed therebetween, a flow of gas being provided through the plant material supply inlet so as to carry the plant material to the conveyor disk, the flow of gas flowing out the plant material supply outlet. The conveyor disk may be a perforated disk having a plant material receiving surface with partitions defined thereon. The conveyor disk may be generally horizontal in a use position. The plurality of inlets and outlets may also include a secondary extraction gas inlet for receiving a heated secondary gas stream and directing the heated secondary gas stream to a secondary extraction area and a secondary extraction gas outlet for receiving the heated secondary gas stream from the secondary extraction area, with the conveyor disk rotating about the disk axis such that plant materials are moved from the extraction area to the secondary extraction area and then moved to the position such that the plant materials after extraction are removed through the plant material outlet.

In some versions, the system also includes an oil/solvent separation system operable to generally separate the collection solvent from the extracted oil so as to provide a generally purified collection solvent and a generally purified oil. The oil/solvent separation system may be a distillation system such as a vacuum distillation system.

In some versions, the collection solvent is a mixture of ethyl alcohol and water. The collection solvent may contain at least 40% ethyl alcohol and/or the ethyl alcohol may be organic ethyl alcohol.

In some versions, the extracted oil is soluble in the collection solvent and at least a portion of the volatized oil is dissolved into the collection solvent in the system.

In some versions, the plant materials are raw plant portions or partially processed plant portions. The plant materials may be partially processed plant portions disposed on a substrate.

In some versions, the heater is operable to heat the gas stream to a temperature at or above a temperature 100 degrees Celsius below a volatilization temperature of the oil to be extracted and the spray of collection solvent in the spray cooling chamber cools the heated gas stream to a temperature that is at or below a condensation temperature of the oil to be extracted or below the temperature of the gas stream exiting the extraction chamber within 5 seconds after the gas stream exits the extraction chamber. The heater may be operable to heat the gas stream to a temperature greater than 100 degrees Celsius and lower than 270 degrees Celsius. The heater may be operable to heat the gas stream to a temperature at or above the volatilization temperature of the oil.

In some versions, the collection solvent is a non-toxic, food-grade solvent.

In some versions, the gas moving device is a blower.

The present invention also provides an extraction chamber for extracting oil from plant matter. The extraction chamber includes a housing having a plurality of inlets and a plurality of outlets, the housing defining an interior area. A conveyor disk is supported in the interior of the housing and rotatable about a disk axis. The plurality of inlets and outlets a plant material supply inlet for receiving plant materials onto the conveyor disk, an extraction gas inlet for receiving the heated gas stream and directing the heated gas stream to an extraction area, an extraction gas outlet for receiving the heated gas stream from the extraction area, and a plant material removal outlet for receiving plant materials from the conveyor disk after extraction for removal. The conveyor disk rotates about the disk axis such that plant materials received through the plant material inlet are moved to the extraction area and exposed to the heated gas stream and are then moved to a position such that the plant materials after extraction are removed through the plant material outlet. The plurality of inlets and outlets may also include a plant material removal inlet generally aligned with the plant material removal outlet with a portion of the conveyor disk disposed therebetween, a flow of gas being provided through the plant material removal inlet so as to carry the plant material after extraction off the conveyor disk and out the plant material removal outlet. The plurality of inlets and outlets may also include a plant material supply outlet generally aligned with the plant material supply inlet with a portion of the conveyor disk disposed therebetween, a flow of gas being provided through the plant material supply inlet so as to carry the plant material to the conveyor disk, the flow of gas flowing out the plant material supply outlet. The conveyor disk may be a perforated disk having a plant material receiving surface with partitions defined thereon. The conveyor disk may be generally horizontal in a use position. The plurality of inlets and outlets may also include a secondary extraction gas inlet for receiving a heated secondary extraction gas stream and directing the heated secondary gas stream to a secondary extraction area and a secondary extraction gas outlet for receiving the heated secondary gas stream from the secondary extraction area, with the conveyor disk rotating about the disk axis such that plant materials are moved from the extraction area to the secondary extraction area and then moved to the position such that the plant materials after extraction are removed through the plant material outlet.

A method is also provided, for extracting an oil from plant material The steps include providing plant material in an extraction chamber and exposing the plant material to a gas stream, the gas stream being heated to a temperature sufficient to cause volatilization of an oil to be extracted from the plant material, the oil being extracted into the gas stream. Then, contacting the gas stream with a collection solvent such that at least some of the oil is captured by the collection solvent and collecting a portion of the oil and collection solvent from the gas stream.

In some versions, the contacting and collecting steps comprise flowing at least a portion of the gas stream through a collection chamber and spraying the at least a portion of the gas stream with collection solvent such that at least some of the oil in the gas stream is captured by the collection solvent and at least some of the collection solvent flows to a lower area of the collection chamber.

In some versions, the collecting step comprises coalescing at least a portion of the oil and collection solvent on surfaces, the surfaces having a temperature at or below a condensation temperature of the solvent, the coalesced oil and collection solvent flowing to a collection area. The surfaces may be inner surfaces of outer walls of passages or chambers through which the at least a portion of the gas stream flows.

In some versions, the step of exposing the plant material to the gas stream comprises exposing the plant material to the heated gas stream for a time period in the range of 15 to 135 seconds.

Another method embodiment includes the steps of providing plant material in an extraction chamber and exposing the plant material to a gas stream, the gas stream being heated to a temperature sufficient to cause volatilization of an oil to be extracted from the plant material, the oil being extracted into the gas stream. Then, rapidly cooling the gas stream to a temperature at or below the volatilization temperature of the oil with a spray of collection solvent after the gas stream flows through the plant material, whereby the oil liquefies into droplets entrained in the gas stream, and collecting a portion of the oil and collection solvent from the gas stream.

In some versions, the process further includes separating the collected portion of the oil and collection solvent so as to provide a generally purified collection solvent and a generally purified oil. The generally purified collection solvent may be recirculated to provide the spray of collection solvent for rapidly cooling the gas stream.

In some versions, the collecting step comprises flowing at least a portion of the gas stream through a collection chamber and spraying the at least a portion of the gas stream with collection solvent such that at least some of the oil in the gas stream is captured by the collection solvent and at least some of the collection solvent flows to a lower area of the collection chamber.

In some versions, the collecting step comprises coalescing at least a portion of the oil and collection solvent on surfaces, the surfaces having a temperature at or below a condensation temperature of the solvent, the coalesced oil and collection solvent flowing to a collection area.

A method in accordance with claim 161, wherein the surfaces are inner surfaces of outer walls of passages or chambers through which the at least a portion of the gas stream flows.

In some versions, the gas stream has a flow rate after the rapid cooling step, the method further comprising slowing the flow rate of the gas stream in an agglomeration chamber after the rapid cooling step.

In some versions, the process further includes agitating or tumbling the gas stream after slowing the flow rate.

In some versions, the step of providing plant material in an extraction chamber comprises moving the plant material in a flow of gas to a conveyor element, conveying the plant material on the conveyor element to the extraction chamber for the exposing step, and then conveying the plant material to a disposal position and moving the exposed plant material off of the conveyor element with a flow of gas.

In some versions, the conveyor element is a conveyor belt or a conveyor disk.

In some versions, the process further includes mixing an additional flow of cooler gas with the gas stream after the exposing step and before the rapid cooling step.

In some versions, the temperature of the gas stream for the exposing step is at or above a temperature 100 degrees Celsius below a volatilization temperature of the oil to be extracted.

In some versions, rapid cooling step cools the gas stream to the temperature at or below the volatilization temperature of the oil within 5 seconds after the exposing.

In some versions, the collection solvent is a mixture of ethyl alcohol and water. The collection solvent may contain at least 40% ethyl alcohol and/or the ethyl alcohol may be organic ethyl alcohol.

In some versions, the extracted oil is soluble in the collection solvent and at least a portion of the volatized oil is dissolved into the collection solvent in the spray cooling step.

In some versions, the plant materials are raw plant portions or partially processed plant portions. The plant materials may be partially processed plant portions disposed on a substrate.

In some versions, the gas stream and the collection solvent are recirculated.

In some versions, the gas stream flows through internal spaces, the temperature of the internal spaces of the system being heated to at least 22.5 degrees Celsius before the heater or any potential ignition sources is powered on. The internal spaces may be heated by heating air within a main housing.

In some versions, the step of exposing the plant material to the gas stream comprises exposing the plant material to the heated gas stream for a time period in the range of 15 to 135 seconds.

A further method for extracting an oil from plant material includes providing plant material in an extraction chamber and exposing the plant material to a first gas stream portion, the first gas stream portion being heated to a temperature sufficient to cause volatilization of an oil to be extracted from the plant material, the oil being extracted into the first gas stream portion. Then, rapidly cooling the first gas stream portion to a temperature at or below the volatilization temperature of the oil after the first gas stream portion flows through the plant material, whereby the oil liquefies into droplets entrained in the first gas stream portion. The method includes mixing the first gas stream portion with a second gas stream portion to form an aggregate gas stream, the second gas stream portion having a temperature less than the first gas stream portion, and collecting a portion of the oil and collection solvent from the aggregate gas stream.

In some versions, the method further includes separating the collected portion of the oil and collection solvent so as to provide a generally purified collection solvent and a generally purified oil.

In some versions, the rapidly cooling step comprises rapidly cooling the first gas stream portion with a spray of collection solvent.

In some versions, the generally purified collection solvent is recirculated to provide the spray of collection solvent for rapidly cooling the first gas stream portion.

In some versions, the collecting step comprises flowing at least a portion of the aggregate gas stream through a collection chamber and spraying the at least a portion of the aggregate gas stream with collection solvent such that at least some of the oil in the gas stream dissolves into the collection solvent and at least some of the collection solvent flows to a lower area of the collection chamber.

In some versions, the collecting step comprises coalescing at least a portion of the oil and collection solvent on surfaces, the surfaces having a temperature at or below a condensation temperature of the solvent, the coalesced oil and collection solvent flowing to a collection area. The surfaces may be inner surfaces of outer walls of passages or chambers through which the at least a portion of the aggregate gas stream flows.

In some versions, the aggregate gas stream at the mixing step has a flow rate, the method further comprising slowing the flow rate of the aggregate gas stream in an agglomeration chamber after the mixing step. The method may further include agitating or tumbling the aggregate gas stream after slowing the flow rate.

In some versions, the step of providing plant material in an extraction chamber comprises moving the plant material in a flow of gas to a conveyor element, conveying the plant material on the conveyor element to the extraction chamber for the exposing step, and then conveying the plant material to a disposal position and moving the exposed plant material off of the conveyor element with a flow of gas.

In some versions, the conveyor element is a conveyor belt or a conveyor disk.

In some versions, the method further includes splitting the aggregate gas stream into the first gas stream portion and the second gas stream portion and/or cooling the second gas stream portion after the splitting step and before the mixing step.

In some versions, the method further includes mixing an additional flow of cooler gas with the first gas stream portion after the exposing step and before the rapid cooling step.

In some versions, the temperature of the first gas stream portion for the exposing step is at or above a temperature 100 degrees Celsius below a volatilization temperature of the oil to be extracted. The rapid cooling step may cool the first gas stream portion to the temperature at or below the volatilization temperature of the oil within 5 seconds after the exposing step.

In some versions, the collection solvent is a mixture of ethyl alcohol and water. The collection solvent may contain at least 40% ethyl alcohol and the ethyl alcohol may be organic ethyl alcohol.

In some versions, the extracted oil is soluble in the collection solvent and at least a portion of the volatized oil is dissolved into the collection solvent in the spray cooling step.

In some versions, the plant materials are raw plant portions or partially processed plant portions. The plant materials may be partially processed plant portions disposed on a substrate.

In some versions, the gas stream and the collection solvent are recirculated.

In some versions, the gas stream flows through internal spaces, the temperature of the internal spaces of the system being heated to at least 22.5 degrees Celsius before the heater or any potential ignition sources is powered on. The internal spaces may be heated by heating air within a main housing.

In some versions, the step of exposing the plant material to the gas stream comprises exposing the plant material to the heated gas stream for a time period in the range of 15 to 135 seconds.

In some versions, at least one additional extraction is performed in series and the plant material is exposed to the heated gas stream for a time period in the range of 15-135 seconds during each extraction.

DETAILED DESCRIPTION OF THE INVENTION

The Nature of the Materials Extracted

The systems illustrated and discussed herein present methods of extracting one or more specific saps, resins, oleoresins, lipids, terpinoids or otherwise volatilizable constituents within a plant material that is being processed. Such constituents are often referred to generically in this disclosure as singular or plural forms of the words "oil" or "plant oil", although other names may be used. It should be known that singular or plural forms of the word "plant material" may refer to raw plant materials that are either wet or dry, or to partially-processed plant materials or plant oils, with partially-processed meaning that the plant material being processed may have been previously conditioned, partially striped of it oils during a previous extraction using the methods discussed herein or other known methods, or that the plant material being processed has previously been processed to have a greater concentration of oil than would naturally occur in the plant. It should also be known that in cases that the oils within the plant materials have been previously concentrated, the plant materials may be disposed on a substrate to facilitate passage through the extraction system and various embodiments described herein.

Description of a Process Cycle of an Exemplary System

Figure 1:
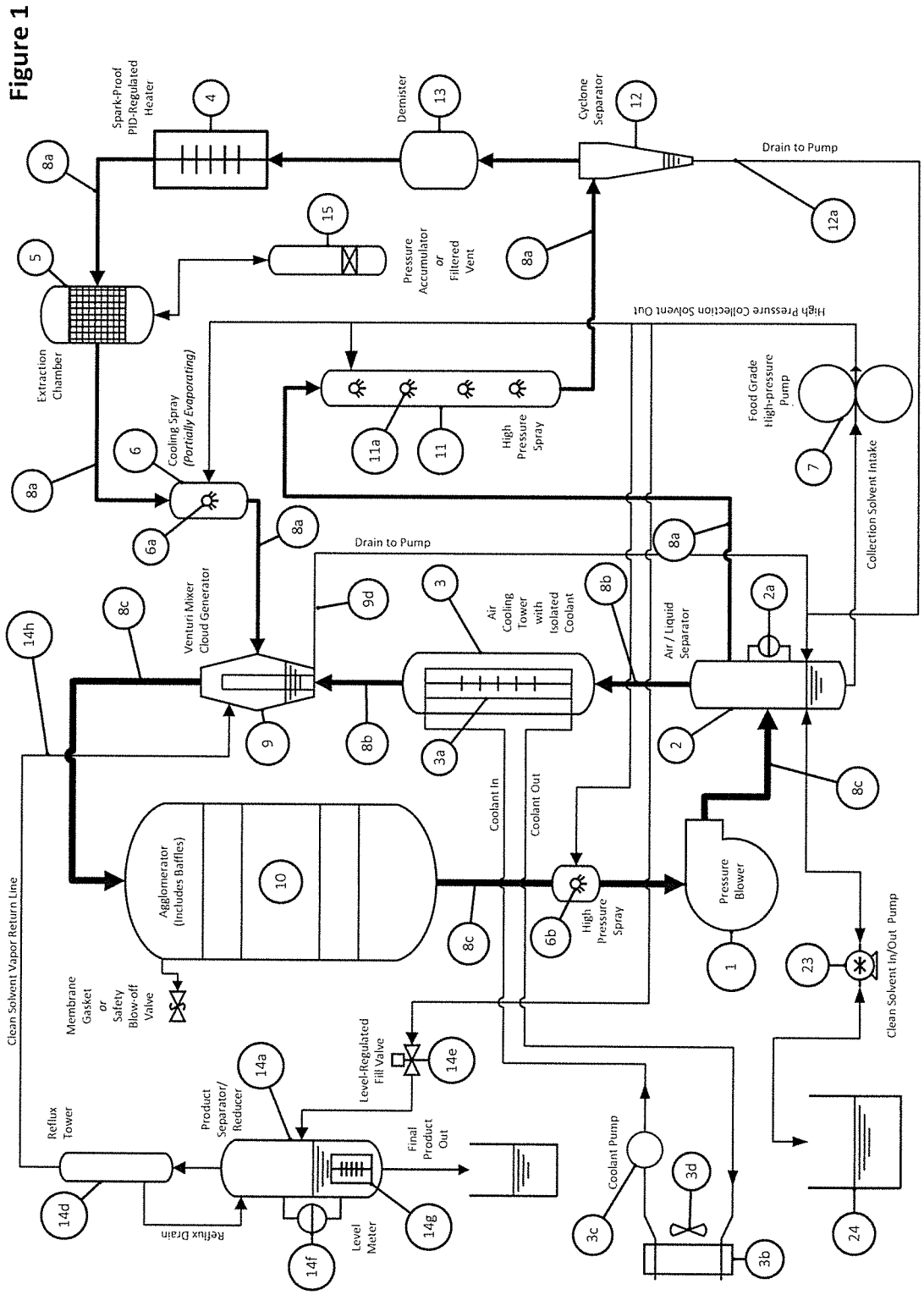
FIG. 1 is a flow-chart diagram of a first embodiment of the invention.

Referring to FIG. 1, a first preferred embodiment of the present invention provides an extraction system in which a blower 1 drives air or gas through a substantially closed loop system of pipes and vessels. The blower 1 is an example of a gas moving device, which may take a variety of forms, including pumps or blowers of various types. Independent of the type, a gas moving device will have some type of inlet and some type of outlet, and will pump, blow or otherwise propel a gas stream from the inlet to the outlet and through the system. The term "gas stream" will be used to refer to air or gas with or without vapor or entrained solids or droplets of liquid therein. As will be clear to those of skill in the art, what constitutes the gas stream will change as the gas stream flows through the system. Additionally, the term "gas stream" may refer to the entirety of the gas stream flowing through the system or portions thereof, such as when the total flow is split into more than one stream.

As the gas stream leaves the blower 1, it is split into two smaller gas stream portions 8a, 8b as it travels through a gas stream splitter 2. The splitter 2 may be said to have a gas inlet and two gas outlets, with the gas stream flowing into the inlet and a gas stream portion flowing out of each of the gas outlets. In the illustrated version, the splitter 2 has the additional function of being a gas/liquid separator and may also serve as a sump area. Alternatively, the splitter and the separator may be separate devices. The flow of the gas stream portions exiting the splitter 2 can be regulated by altering the orifice sizes of the two gas outlets of the splitter. It should be noted that the flows do not need to be equal to each other. The gas outlet passages are labeled as 2b and 2c in FIG. 1.

As the gas stream leaves the splitter 2, a portion of the gas stream, referred to as the second gas stream portion 8b, continues onward through a gas cooling tower 3 (via passage 2c), and the other portion of the gas stream, referred to as a first gas stream portion 8a, passes (via passage 2b) through a series of oil droplet collection devices (discussed hereinbelow) before entering a temperature-regulated heater 4.

As the first gas stream portion 8a passes through the heater 4, it is heated to a temperature that has been selected to induce volatilization of one or more specific oil constituents within the plant material that is being processed. The temperature of the first gas stream portion 8a passing through the heater 4 may be adjusted to selectively volatilize any one of several oils within the plant material or a group of oils that volatilize within a certain temperature range. The preferred method of controlling the temperature output of the heater 4 may utilize electronic Proportional Integral Derivative (PID) control loops and relays, however, other methods may also be used.

Figure 4:
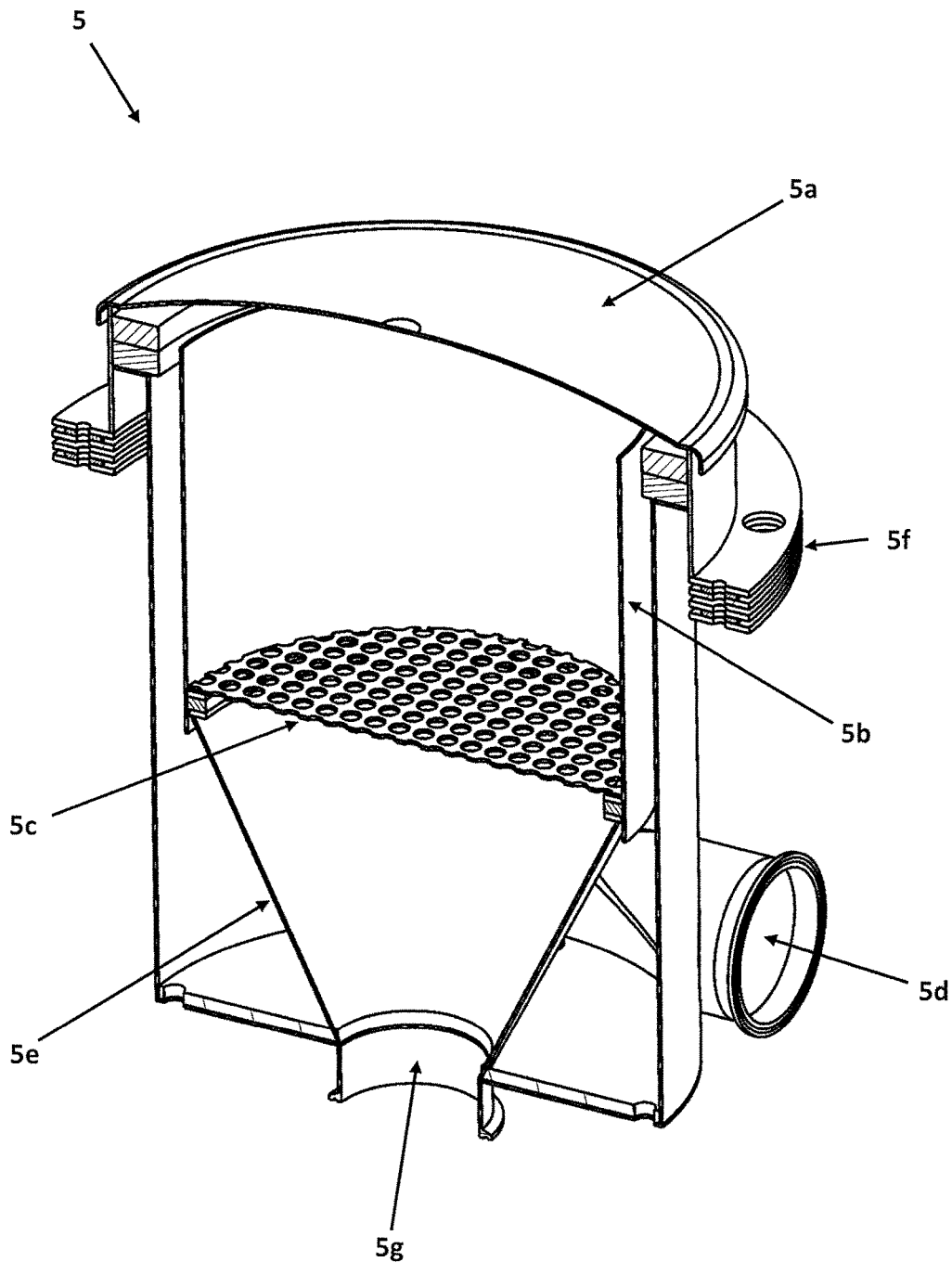
FIG. 4 is a cross-sectional view of an embodiment of an extraction chamber that may be utilized within the invention.

When the heated first gas stream portion 8a leaves the heater 4, it enters an extraction chamber 5. It is within this extraction chamber 5 that extraction of oil from the plant material occurs. FIG. 4 provides a detailed cross-section view of an exemplary embodiment of an extraction chamber 5 for use with the present invention. The extraction chamber 5 may include several features, including a sealable lid 5a and a removable container 5b with a perforated or screened bottom 5c that holds the plant material in the container while also allowing the gas stream to pass through. The term "perforated" is used herein to mean any approach to making an element porous to a gas, such a holes, a screen, or materials that are inherently porous. The sealable lid 5a of the extraction chamber 5 may be a commercially available manway cover with the ability to be tightly sealed or a custom designed lid. The heated first gas stream portion 8a enters the chamber through a tangential passage 5d and begins to swirl up and around the interior perimeter of the extraction chamber 5. As the first gas stream portion 8a approaches the top of the extraction chamber 5, it reverses course and is driven down through the plant material that is held in the removable container 5b. As the heated first gas stream portion 8a passes through the plant material, oils within the plant material that have a boiling point that is at or below the temperature of the first gas stream portion begin to rapidly volatilize and become entrained in the gas stream. These entrained oils may be in the form of a vapor and/or as entrained droplets. It should be known that some oils that have a boiling point above the temperature of the first gas stream portion may also be volatilized, but at a slower rate. It should also be clear that other substances may be picked up by the first gas stream portion. They may include water vapor, dust or dirt, plant particles and/or other solids. These other substances are not of primary interest in the process and will be discussed only as necessary.

After the first gas stream portion 8a passes through the removable container, it enters a cone 5e that funnels the first gas stream portion 8a, including the oil extracted from the plant material, through the exit 5g of the extraction chamber 5. It should be noted that a feature of the extraction chamber 5 is that the clean, hot gas stream entering the extraction chamber 5 first heats the exit cone 5e and the removable container 5b. This heats the interior surfaces of the exit cone 5e and removable container 5b to a temperature sufficient to prevent condensation of the volatilized oil on these surfaces thereby avoiding loss and damage of the oil. The extraction chamber 5 may also include a stack of insulator/heat exchanging rings 5f to protect the surface to which the extraction chamber 5 is mounted from excess heat. The extraction chamber 5 is an example of one of several embodiments that will achieve the desired results of the invention. Additional preferred embodiments illustrated in FIGS. 17-26 will later be discussed in detail.

Referring again to FIG. 1, as the first gas stream portion 8a exits the extraction chamber 5, it immediately enters a spray cooling chamber 6 where the first gas stream portion 8a is contacted with a spray 6a of collection solvent. The solvent is delivered to this section of the system preferably by a food-grade, high pressure pump 7, which may also be utilized to deliver solvent to other parts of the system. It should be noted that in some embodiments it is preferable to use a separate pump to deliver solvent to the spray cooling chamber 6. An azeotropic ratio of approximately 95.5% ethyl alcohol and 4.5% water is the preferred collection solvent, however, other ratios of alcohol and water and other solvents may also be used. It is recommended that if alcohol is used as a solvent, a concentration of at least 40% alcohol to water be used. If ethyl alcohol is the chosen solvent, organic alcohol is preferred. The contacting of the first gas stream portion 8a with the high pressure cooling spray 6a accomplishes three primary functions: it flash-cools the first gas stream portion 8a to prevent heat-induced degradation of the plant oils, it causes most of the volatilized oils to condense into droplets within the first gas stream portion 8a, and it begins the first stage of dissolving and capturing the plant oils in the collection solvent by capturing volatilized oils that condense directly on the surface of the spray droplets. It should also be known that as the spray 6a cools the hot first gas stream portion 8a, a portion of the spray 6a may be volatilized into the first gas stream portion 8a, which helps facilitate oil droplet growth in a later stage in the system (soon to be discussed) and promotes solvent condensation on the surfaces of the internal parts of the system to aid with washing off any oils that collect on these parts. While FIG. 1 shows the spray cooling chamber 6 spaced from the extraction chamber 5, the spray cooling chamber 6 may be immediately adjacent the extraction chamber or the chambers may be integrated with the spray cooling occurring at the exit 5g.

In some embodiments of the invention, it may be beneficial to cool the first gas stream portion 8a exiting the extraction chamber 5 by mixing it with a second gas stream 8b of a lower temperature, prior to contacting the first gas stream portion 8a with a collection solvent. This arrangement would be one way to prevent any collected oils within the collection solvent emitted in the cooling chamber 6 from being re-volatilized upon encountering the heated first gas stream portion 8a exiting the extraction chamber 5. In such an embodiment, the high pressure cooling spray 6a of collection solvent would be relocated away from the exit 5g, and the heated first gas stream portion from the extraction chamber 5 would first travel through a gas stream mixing device 9 (soon to be discussed) to be mixed with a cooler gas stream prior to or simultaneous with encountering the high pressure cooling spray 6a of collection solvent. It should be noted that the first gas stream, either alone or mixed with the additional gas stream, still proceeds rapidly from the extraction step to the cooling step, due to the flow rate. The volatilized oil is at the higher temperature only for a short period of time before being rapidly cooled to a temperature at which it liquefies and becomes droplets entrained in the stream. It should also be known that a method using a mixer as a rapid cooling device is optional.

Figure 5:
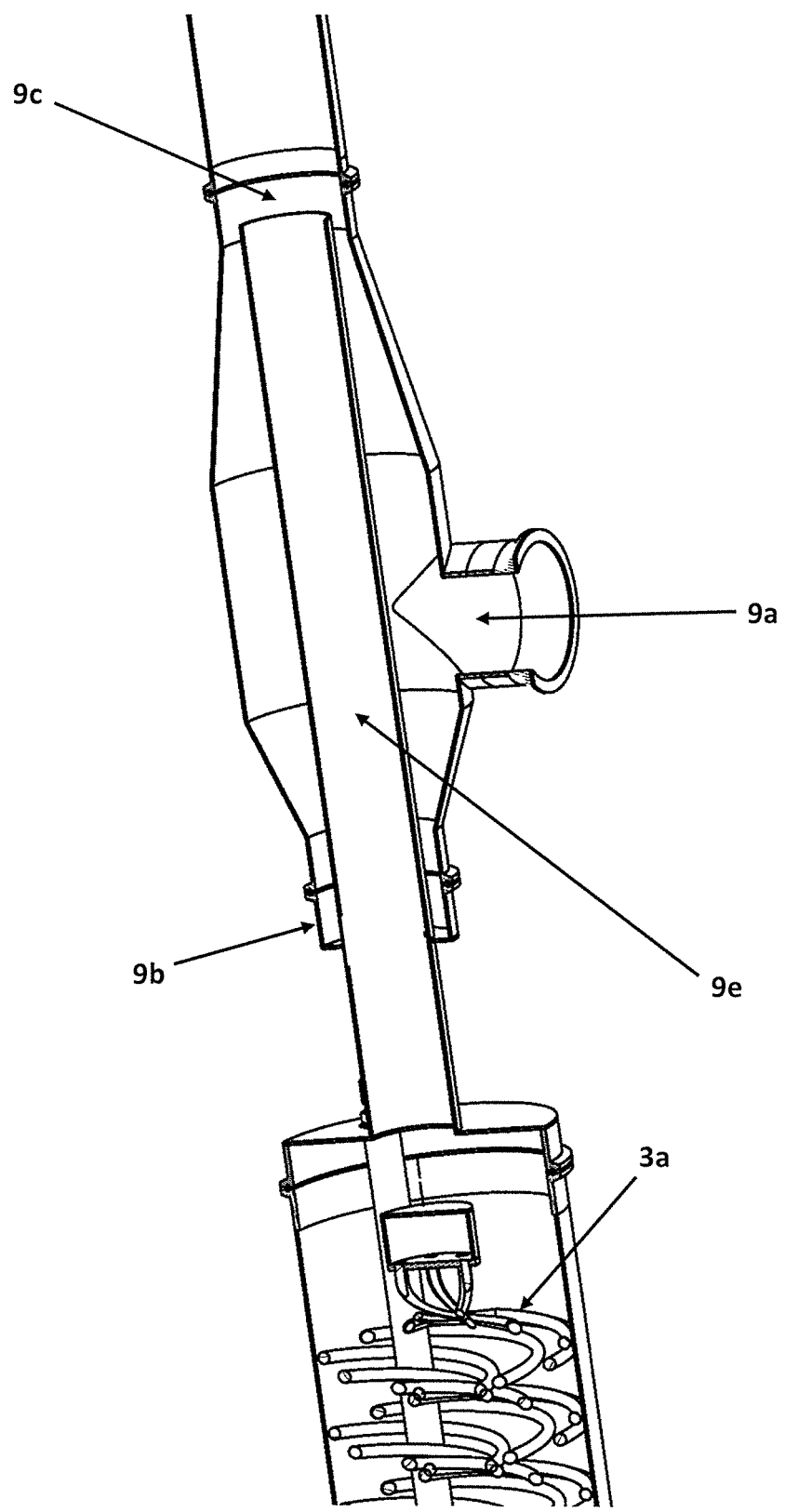
FIG. 5 is a cross-sectional view of an embodiment of a gas stream mixer that may be utilized within the invention.

After passing through the spray cooling chamber 6, the cooled first gas stream portion 8a contains an entrained mixture of collection solvent droplets (a portion of which may contain captured plant oils), a fog of very small and sub-micron sized condensed plant oil droplets, some volatilized collection solvent, and a small amount of volatized oil that has not yet condensed. (For definition purposes, this mixture in any proportions is still considered a gas stream in the present invention.) This entrained mixture continues through the system and enters a modified venturi-type gas stream mixer/supersaturation generation device 9. The gas stream mixer 9 is depicted in a detailed cross-sectional view in FIG. 5. The first gas stream portion 8a enters the gas stream mixer 9 through an entrance or first gas inlet 9a, which is optionally tangential to induce centrifugal separation of the heavier collection solvent droplets and condensed plant oil droplets. The mixture of collection solvent and plant oil that has been separated from the first gas stream portion drips down the sides of the gas stream mixer 9 into a pooling area 9b and is then drained into a liquid drain line 9d (see FIG. 1) that eventually leads to the intake of the high pressure pump 7. It should be known that other embodiments of the mixing device may be constructed or placed such that the separated liquids are carried to the pump 7 without the aid of a dedicated drain line.

The remaining plant oil droplets that were too small to be centrifugally separated from the first gas stream portion 8a, are drawn, along with the surrounding first gas stream portion 8a that has entered the mixer 9, into the venturi section 9c of the gas stream mixer. Within the venturi section 9c of the gas stream mixer, the warmer first gas stream portion 8a from the extraction chamber 5, which preferably contains some vaporized collection solvent, is violently mixed with a cooler second gas stream portion 8b that has entered the mixer through a second gas inlet 9e after exiting the cooling tower 3. As these two gas stream portions mix and combine into one, the resulting mixed gas stream (the "aggregate gas stream") 8c is caused to be in a super-saturated state in which it is oversaturated with collection solvent vapor prior to entering an agglomeration chamber 10 section of the system, which is shown in FIGS. 1, 2, 3 and 6. The super-saturated state of the aggregate gas stream 8c results in condensation of collection solvent vapor on the surface of the hard to collect small and sub-micron sized plant oil droplets, causing the oil droplets to increase in size and mass. The agglomeration chamber 10 may be of a larger diameter than other passages in the system to reduce the velocity of the gas stream and give the oil droplets additional time to "grow" into larger, heavier droplets. Growing the small plant oil droplets into larger droplets enables the droplets to be more effectively collected in downstream sections of the system using various particulate/droplet separation methods that will soon be discussed. It should be known that the primary purpose of the agglomeration chamber 10 is to create time for small oil droplets to grow and agglomerate, and thus could be substituted with a longer passage through the system in place of a shorter, larger diameter section. Increasing agitation of the gas stream in the agglomeration chamber also facilitates droplet growth and agglomeration and baffles 10a may be included in some embodiments to provide this agitation.

Figure 6:
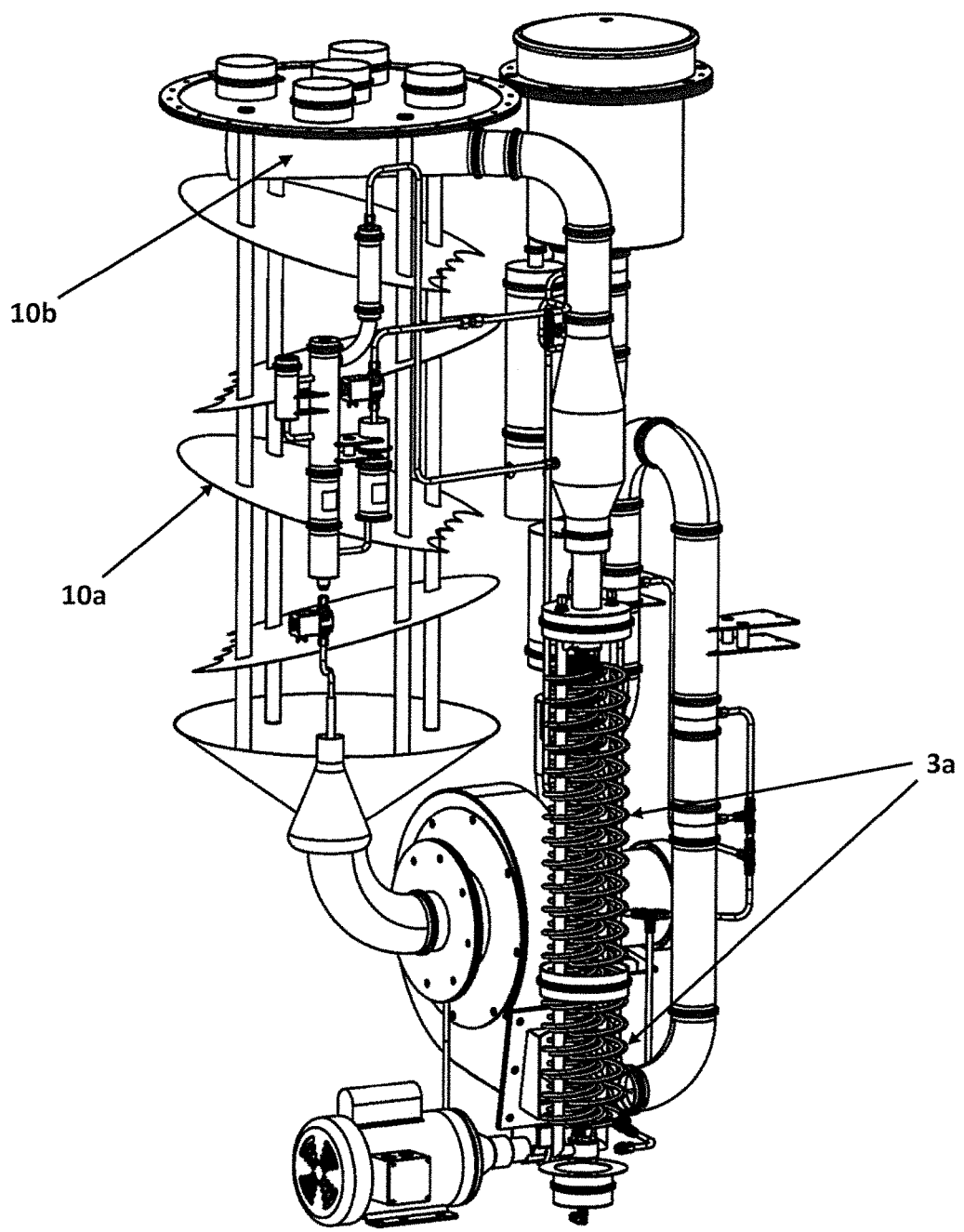
FIG. 6 is a perspective view of the internal components of an embodiment of the invention in which the outer surfaces of the agglomeration chamber and the cooling tower have been removed to show the internal structure of these parts.

In FIG. 6, the agglomeration chamber 10 is shown with the outer housing removed such that internal structures within the chamber are visible. As mentioned, the agglomeration chamber may contain baffles 10a to churn and tumble the gas stream and aid in droplet growth. Any oil or solvent droplets that condense or coalesce on the internal surfaces of the agglomeration chamber will drip down the internal walls of the agglomeration chamber and through the blower 1, eventually reaching the splitter 2 (which also serves as a gas/liquid separator) before flowing into the high pressure pump 7 intake (see FIG. 1). Note that the aggregate gas stream 8c from the gas stream mixer 9 is introduced to the inside of the agglomeration chamber 10 through an expansion cone 10b (see FIG. 6). The expansion cone 10b recovers much of the pressure drop that results from directing the first and second gas stream 8a, 8b through the gas stream mixer 9. It should be noted that in many applications, it may be preferable to use multiple agglomeration chambers, either in parallel or in series, to achieve desirable results within the system. It should also be noted that in some embodiments, if an efficient method of promoting a supersaturated state in the gas stream is achieved, it may be possible to reduce the size of the agglomeration chamber or eliminate it entirely while still maintaining similar results to embodiments that include an agglomeration chamber.

The gas stream exiting the agglomeration chamber 10 may now consist mostly of a thick "mist" of larger droplets of plant oil dissolved in collection solvent and substantially less of the hard to capture sub-micron oil droplets. From here, the gas stream passes through its first primary droplet separation device, which in some embodiments is the blower 1. As the mist of droplets enters the blower 1, the largest of the droplets impinge with the rapidly spinning blower 1 blades while other larger and medium-sized droplets are slung into the walls of the blower 1 by means of centrifugal force. Any droplets that contact the blower blades or internal surfaces of the blower 1 are effectively captured, and drip down through the blower 1 and into lower sections of the system where they eventually are guided to the high pressure pump 7 intake, through shared line 1a. To further facilitate collection and cleaning of the machine, an optional spray 6b of collection solvent may be placed immediately upstream of the blower 1. The gas stream exiting the blower 1 now contains mostly smaller oil and solvent droplets that could not be removed by blade impingement or centrifugal force, but may be removed by spray impaction means that will soon be discussed.

After exiting the blower 1, the gas stream enters the splitter 2, which also serves as a gas/liquid separator. Part of the gas stream leaving the splitter 2 is directed (via passage 2c) through the cooling tower 3 and the remainder of the gas stream is directed (via passage 2b) through a section of the system that eventually passes through the extraction chamber/5. The gas/liquid separator, forming part of the splitter 2 in this embodiment, is ideally located at the lowest part of the invention. However, in some embodiments of the invention the gas/liquid separator may be located in other areas. A primary function of the gas/liquid separator is to collect any liquids that have dripped down from higher levels of the system, such as the agglomeration chamber 10, the blower 1, the cooling tower 3, and the high pressure spray impaction lines (soon to be discussed), and act as a sump/vessel that feeds collection solvent and other accumulated oils and liquids back into the high-pressure pump 7. It is recommended that the liquid draining from the gas/liquid separator pass through a filter (not shown) prior to entering the high pressure pump 7. The gas/liquid separator may include one or more fluid level monitoring devices 2a. Such fluid level monitoring devices 2a will serve as a safety system to shut down the system in cases that the fluid level is too low, in order to prevent dry running of the pump or allowing the system to operate without the solvent sprayers 6a, 11a being active. These level sensors 2a may also provide feedback to the solvent introduction/removal pump 16 as discussed in a following section of this application.

The first gas stream portion that exits the splitter 2 via passage 2b flows to a collection chamber 11 where it is bombarded by collection solvent droplets emitted from a series of high pressure collection solvent sprayers 11a. The droplets of collection solvent exiting the sprayers 11a impact the plant oil droplets entrained in the gas stream. When a droplet of collection solvent impacts a plant oil droplet, the plant oil droplet is captured in the collection solvent droplet. Most of the collection solvent droplets containing captured oil continue on their trajectories to impact and coalesce on the internal walls of the collection chamber 11 and gas stream passages. It should be noted that in his embodiment the gas stream passages may be considered to be a collection chamber 11 and that in other embodiments the collection chamber 11 may be of a different diameter, shape or structure than the gas stream passages. The coalesced droplets drip down through the various passages of the system to eventually reach the gas/liquid separator, where they are guided back to the high-pressure pump 7 intake. It should be noted that in some cases the coalesced liquid may be flowing in the opposite direction as the gas stream as it drips down internal walls.

The collection solvent droplets emitted from the high pressure sprayers 11*a* should preferably have a diameter that is greater than one micron and less than 300 microns. However, some of these droplets may be smaller and light enough to be carried along with the first gas stream portion without coalescing onto the internal passages. Before the first gas stream portion enters the heater 4, all of the larger collection solvent and dissolved oil droplets should preferably be removed to avoid the potential of collision with a heating element or hot surface. Such contact could result in burning the plant oil contained in these droplets, which could subsequently introduce unwanted odors, colors and impurities into the extracted oil product. Entrained submicron droplets are less of a concern because they will be instantly volatized upon entering the heater before having time to contact any heated surfaces. To prevent the larger entrained droplets from making contact with heated surfaces, the first gas stream portion may be guided into a cyclone separator 12 or other suitable separator device. The cyclone separator 12 is preferably sized such that it will effectively remove over 95% of the droplets that are larger than one micron in diameter. Droplets that are collected in the cyclone separator 12 drain through a drain tube 12*a* that connects to the gas/liquid separator, as part of splitter 2, or to a passage that leads to the gas/liquid separator. It should be noted that in some embodiments, a portion of the liquid that has coalesced on the passages preceding the cyclone may drain into the cyclone 12 where it will subsequently pass through the cyclone drain tube 12*a* to eventually reach the sump area of the system.

After the first gas stream portion 8*a* exits the cyclone separator 12, it passes through an optional demister 13, which may contain demisting pads or fins or other known substrates designed to cause droplets to coalesce. The demister 13 is designed to "polish" the first gas stream portion by removing any remaining entrained droplets from the first gas stream portion before the first gas stream portion am continues on through the heater 4. Droplets that coalesce with the demisting pads or fins will drip down the walls of the demister 13, down through the cyclone separator 12, through the cyclone drain 12*a* and into the gas/liquid separator or sump, where the liquid will preferably be filtered before entering the high-pressure pump 7.

It is important to note that several additional embodiments may be designed that fall within the scope of this invention. For purposes of clarity in describing the functioning of the invention, some such embodiments will be discussed after the following sections.

Cooling of the Gas Stream and Condensation Washing of the System

As discussed earlier, and shown in FIG. 1, a second portion of the gas stream 8*b* exits the splitter 2 through passage 2*c* and enters cooling tower 3. The cooling tower 3 is cooled by directing water or another type of coolant through cooling coils 3*a* housed within the cooling tower 3. FIG. 5 provides a cross sectional view of an upper portion of the cooling tower, with the cooling coils 3*a* contained therein. FIG. 6 shows the cooling tower with the outer housing removed such that the cooling coils 3*a* are exposed. The coolant that passes through the cooling coils 3*a* first passes through an external heat exchange system. As depicted in FIG. 1, the external heat exchange system may consist of a fan-driven, air-cooled heat exchanger 3*b*, similar to the radiator system found in an automobile. As the gas stream passes through the cooling tower 3 and over the cooling coils 3*a*, the gas stream is cooled to the desired temperature.

The water/coolant supply is driven by a coolant pump 3*d* that may be located within the main system or within the external heat exchanger system. The internal temperature of the sections of the system that are downstream from the heater 4 and extraction chamber 5 are regulated by restricting flow to the cooling coils 3*a* or by varying the temperature of the coolant. Flow through the cooling coils 3*a* may be regulated by pulsing power to the coolant pump 3*c*, or by using solenoid valves to regulate the coolant flow through the cooling coils 3*a*. The coolant temperature can be regulated by altering the volume of air that is passing over the external heat exchanger 3*b*, which may be accomplished by regulating power to the heat exchanger fan 3*d*. It should be noted that in some embodiments of the invention, the cooling system described above may be used in conjunction with or be replaced by a cooling system wherein the collection solvent is passed through a heat exchange device such that the cooled collection solvent may be used to regulate the internal temperature of the system. It should also be known that in other embodiments the closed cooling systems described may be substituted for an open cooling system wherein cold water from a water supply source is passed through the cooling coils 3*a* to regulate the temperature of the system.

Regulating the temperature of the gas streams throughout the system is important to ensure that the majority of the gas stream is not at a temperature that will cause the collection solvent to boil, and to ensure that certain portions of the gas streams are saturated to the point that the internal components of the system will "sweat" with collection solvent condensation. Since the external parts of the system are exposed to the atmosphere, condensation will form on the inner surfaces of the system that are exposed to a warm, collection-solvent-laden gas stream. By promoting such a "solvent humid" environment, the internal parts of the system are constantly "condensation washed" with collection solvent, preventing any plant oils from accumulating. To further enhance this effect, forced air from one or more fans (not shown) may be guided over the external parts of the system. This condensation washing effect may be further enhanced by the collection solvent purification process, as discussed in the following section. It should be noted that this condensation-based cleaning system may significantly enhance oil yield. It should also be noted that the condensation-based cleaning system may be used in conjunction with or be replaced by a spray-based cleaning system that would include directing a spray 11a of collection solvent to areas of the system that need to be cleaned of plant oils.

Collection Solvent Purification and Final Product Removal

As the system operates, the collection solvent may be continuously or intermittently purified using a secondary distillation system 14. An example embodiment of this secondary distillation system 14 can be viewed in flow-chart form in FIG. 1, and can be viewed in greater detail in FIGS. 7 and 8. With various methods to soon be discussed in detail, collection solvent containing plant oils is introduced to the secondary distillation system 14 from the main sections of the collection solvent system. This solvent is subsequently distilled, yielding a fraction of generally purified collection solvent that is substantially free of plant oils and a generally purified or concentrated volume of plant oils that is collected as a final product. The term "generally purified" is used to mean that the solvent or oil is purified enough that other materials are at very low levels or levels that do not otherwise interfere with use. In some examples, the generally purified or concentrated oil may still contain solvent in order to improve viscosity and handling. As the distillation system 14 operates, generally purified collection solvent is continuously or intermittently reintroduced back into the main sections of the system in the form of a liquid or vapor. If the purified collection solvent is reintroduced to the main process line as a vapor, it can optionally be used to aid in separation of the oil from the gas stream by contributing to the growth of the oil droplets in the agglomeration chamber 10, while simultaneously condensing on the internal surfaces of the system and providing an additional condensation washing function for any oils that have accumulated on such surfaces. The vapor introduction would preferably be within the gas stream mixer 9, however, this location may be changed as necessary to facilitate cleaning of the internal parts of the system. It should be noted that in many applications, it may be preferable to reintroduce the generally purified collection solvent as a liquid with the aid of an additional pump 26 (see FIG. 9) to areas of the system that will benefit from a generally purified solvent as opposed to a solvent that contains captured plant oils. An example of where the introduction of a generally purified collection solvent vs. collection solvent containing oils may be preferred is in the rapid-cooling spray 6a that contacts the first gas stream portion in the cooling chamber 6. Such a method of introducing a generally purified solvent here will prevent any captured oils in otherwise un-purified collection solvent from being re-vaporized when these oils encounter the hot first gas stream portion exiting the extraction chamber 5.

Figure 7:
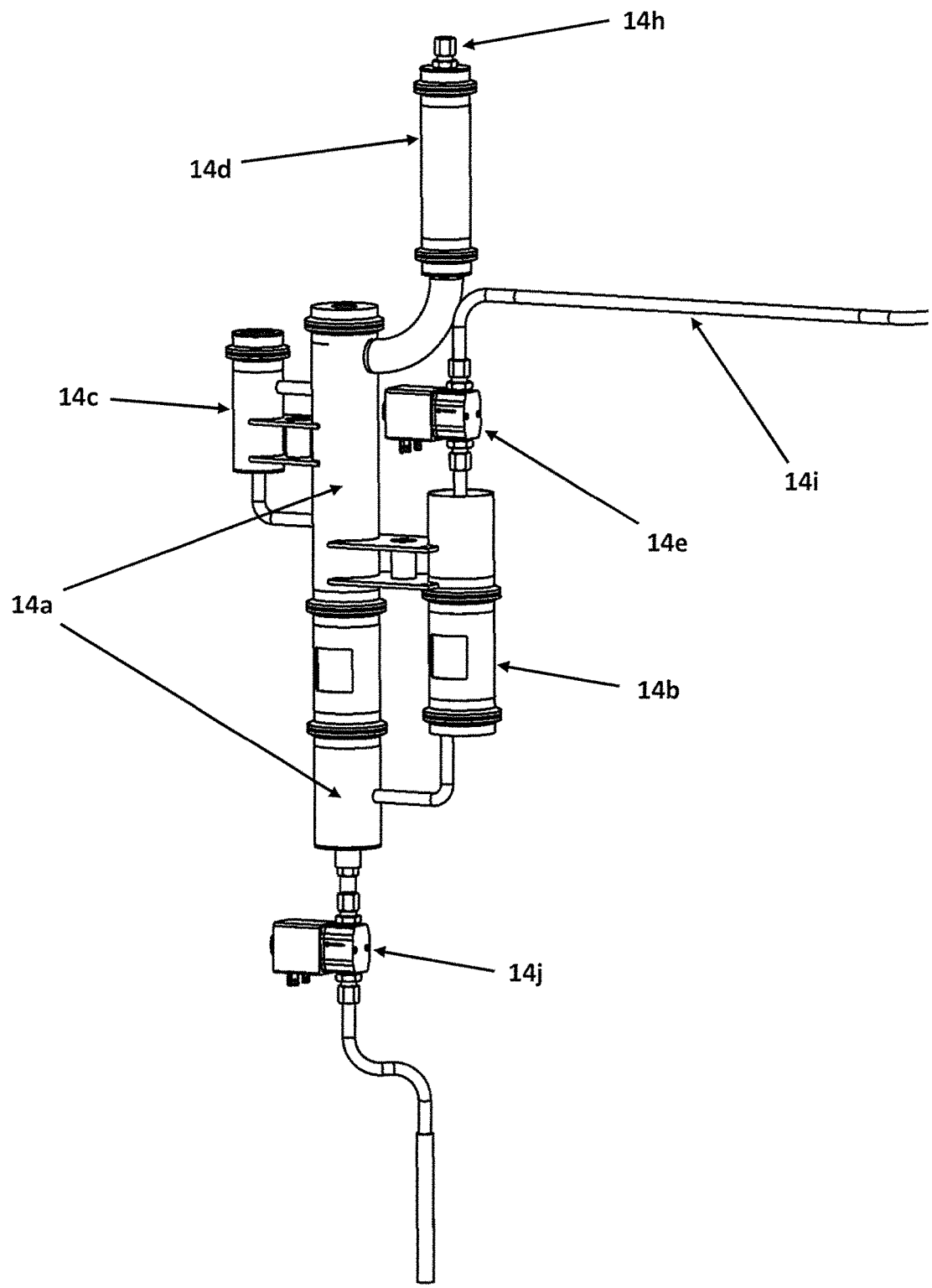
FIG. 7 is a detailed perspective view of an embodiment of a collection solvent purification system that may be utilized by the invention.
Figure 8:
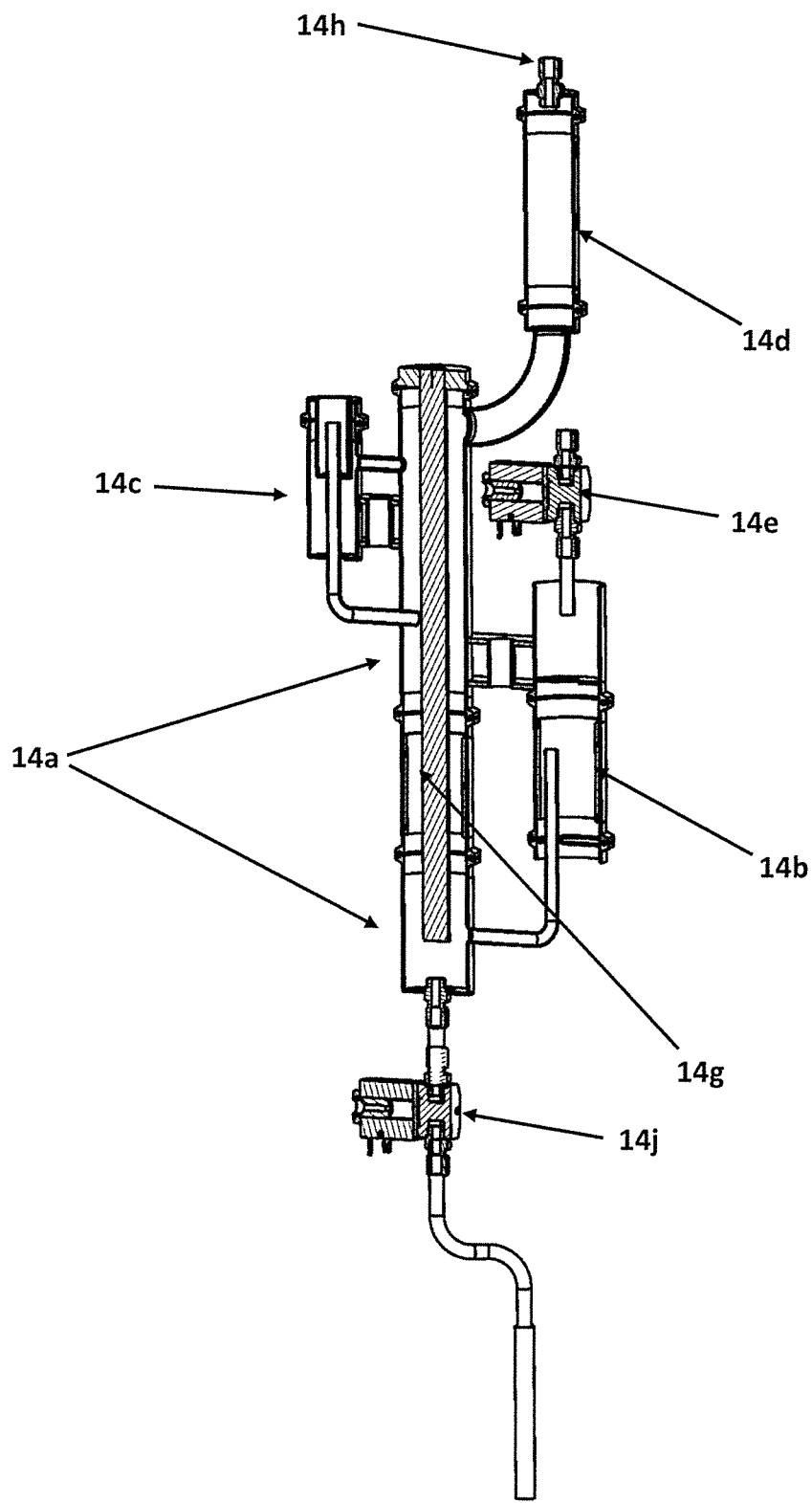
FIG. 8 is a cross-sectional view of an embodiment of the collection solvent purification system that may be utilized by the invention.

During the collection solvent purification process, the plant oil is separated from the collection solvent and becomes concentrated in the secondary distillation/solvent purification system 14, which also serves to remove the final oil product from the system. The separated plant oils are removed from the system when the desired concentration or collected volume has been attained. Referring to FIGS. 1, 7 and 8, the collection solvent purification system 14 includes a primary boiling chamber 14a, a first side chamber 14b where solvent containing oil is introduced to the boiling chamber, a second side chamber 14c that contains a fluid level sensor 14f and an optional reflux tower 14d that returns heavier liquids (such as water or plant oil) that may have been partially distilled along with the solvent, back into the boiling chamber 14a. Not shown in this figure is an optional condensation chamber, which will be of particular importance if vacuum assisted distillation is employed (described in greater detail in the following embodiment). Collection solvent containing plant oils is introduced to the boiling chamber 14a from the main system via a solenoid valve 14e that is connected to a collection solvent line. This solenoid valve 14e is controlled by a float switch or fluid level sensor 14f that is located in the side chamber, or optionally in the primary chamber. It is preferred to have the fluid level detection system in the side chamber 14c or otherwise positioned such as to protect it from false readings caused by rapidly boiling solvent. In certain embodiments, it may be advantageous to have a separate pump for introduction of the liquid. The boiling chamber 14a contains a heating element 14g (best shown in the cross-sectional view of FIG. 8) that rapidly boils the mixture of collection solvent and plant oils that have been delivered to the boiling chamber from the solvent line. In an alternative approach, the boiling chamber is externally heated. External heating may be preferred in a vacuum distillation version of the collection solvent purification system, as will be shown in a following embodiment. The generally purified collection solvent may be introduced back into the main gas stream of the system through a vapor line 14h or, in other embodiments, may be introduced in liquid form, preferably with the aid of an additional pump 26 (see FIG. 9), to areas of the system where it is most required. When the fluid level in the boiling chamber 14a drops, the level sensor signals the solenoid valve 14e to send more collection solvent from the primary collection solvent spray line or by aid of a separate pump (not shown) to maintain a fluid level that ensures that the hot zones of the heating element 14g, or in other embodiments the heated lower portions of the boiling chamber 14a, remain submerged. A thermocouple (not shown) is inserted into the boiler section to provide feedback to the system that controls the heating element 14g or heated portions of the chamber. In one embodiment, when the thermocouple senses a rise in the otherwise stable boiling temperature of the solvent solution, an alarm/indicator is triggered to alert the operator that the mixture is saturated or otherwise at a desired constancy and that it is time to drain the final product from the system. The temperature set point of this alarm may be adjusted to alter the level of concentration of oil versus solvent in the final product, and in some embodiments may be designed to remove the solvent completely in a later phase. Alternatively, a capacitance sensor may be used to measure oil saturation. In this particular embodiment of the invention, a removal solenoid valve 14j has been installed at the bottom of the distillation system to facilitate final product removal. The solenoid 14j can be operated by a push button that is only active when a Programmable Logic Controller (PLC) that controls the process permits it to be; however, manually operated valves may also be used as long as precautions are taken to ensure that the machine cannot operate with the valve open and risk spillage of the final oil product.

Figure 9:
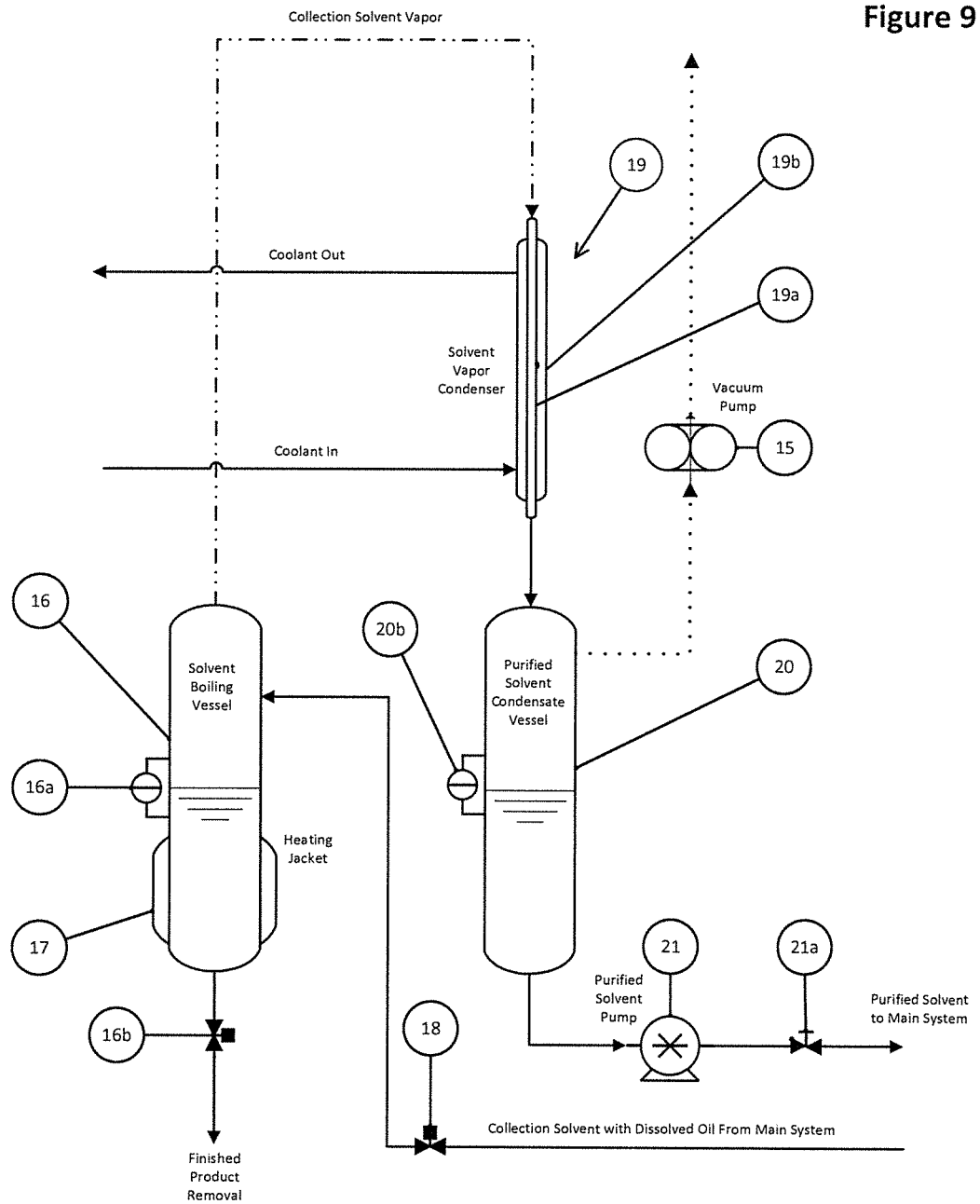
FIG. 9 is a flow-chart diagram of another embodiment of the collection solvent purification system that utilizes vacuum distillation.

It should be particularly noted that, as mentioned above, this secondary distillation process may take place at atmospheric pressure or with the aid of a vacuum. In cases where the plant oils are particularly sensitive to heat, it is preferred that a vacuum distillation process be utilized. A flow-chart diagram of an embodiment of a vacuum distillation system is illustrated in FIG. 9. In this embodiment, a vacuum pump 15 is utilized to remove air or gas from the system to create at least a partial vacuum, and a boiling vessel 16 is included to boil a volume of collection solvent containing plant oils. The boiling vessel 16 is surrounded by a heating jacket 17, the temperature of which can be controlled precisely via a PID controller or mechanical control systems. A fluid level sensor 16a measures the level of liquid in the boiling vessel 16 and controls an introduction solenoid valve 18 that is operable to introduce a mixture of collection solvent and dissolved oils to the boiling vessel 16 from the main collection solvent system. A Liebig-type condenser 19 is included that consists of a condensation tube 19a that passes through a chamber 19b to which a flow of coolant is introduced, however, it should be known that many forms of heat exchangers or condensers may be used to achieve similar results. As the boiling vessel 16 is heated, collection solvent is distilled from the plant oils and collection solvent vapor is passed out of the boiling vessel 16 and through the condensation tube 19a, where it condenses into a generally purified liquid. The generally purified liquid collects in a condensate vessel 20 from where it may be removed from the vacuum system via a removal passage 20a (see FIG. 10). The removal passage 20a is connected to a positive displacement solvent re-introduction pump 21 that re-introduces the condensed collection solvent to the main system, preferably via the rapid cooling spray 6a in the cooling chamber 6. An optional check valve 21a may be included to prevent the vacuum within the system from drawing solvent backwards through the re-introduction pump 21. A second level sensor 20b is in communication with the condensate vessel 20 to measure the level of condensed collection solvent. When the level of condensed collection solvent becomes too high, the second level sensor 20b sends a signal to cut power to the heating jacket 17 to prevent the speed of distillation from exceeding the speed by which the re-introduction pump 21 re-introduces purified solvent back to the main system. As with previous embodiments, one or more capacitance sensors or thermal sensors may be in communication with the boiling vessel 16 to determine the concentration level of plant oil vs. solvent contained in the solvent boiling vessel 16. When the concentration of plant oils in the solvent boiling vessel 16 has reached the desired concentration and volume, a removal solenoid valve 16b may be used to remove the final extracted oil product from the system.

Figure 10:
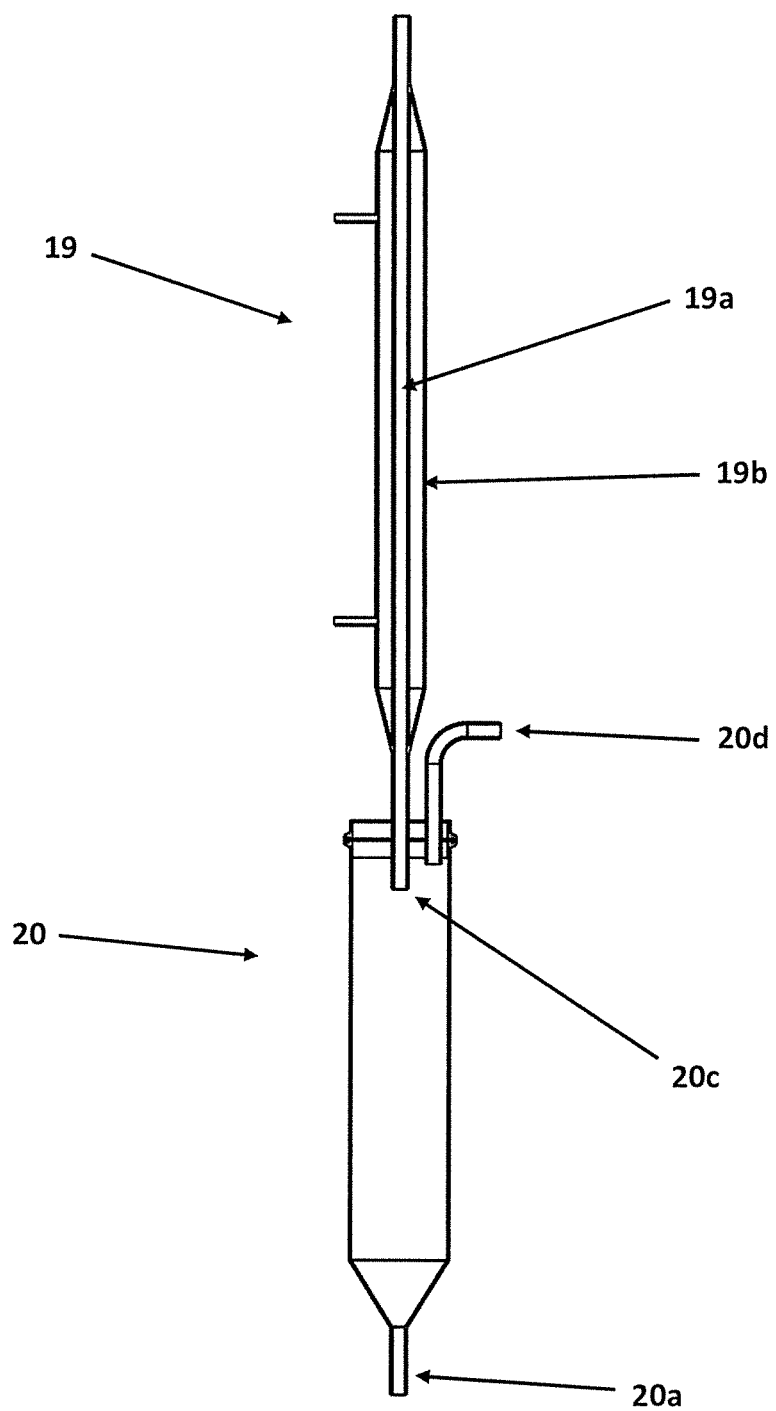
FIG. 10 is a cross-sectional view of the solvent condenser and condensate vessel sections of an embodiment of the vacuum distillation system.

FIG. 10 shows a cross-section view of the Liebig condenser and condensate vessel 20 portions of the embodiment illustrated in diagrammatic form in FIG. 9. In FIG. 10, the internal details of the Liebig condenser 19 and condensate vessel 20 can be seen in greater detail. The Liebig condenser includes a condensation tube 19a surrounded by a jacket 19b containing a flow of coolant. The condensate vessel 20 includes a condensed solvent entry passage 20c that is in communication with the condensation tube 19a of the Liebig condenser 19, a condensed solvent removal passage 20a and a vacuum pump hookup passage 20d whereby air or gas may be removed from the system via a vacuum pump 15 to create at least a partial vacuum within the distillation system. It should be noted that other types of known vacuum distillation systems may be utilized and that these systems, including the embodiment illustrated in FIGS. 9 and 10 may be comprised of various materials, including stainless steel.

The Breather System

Figure 2:
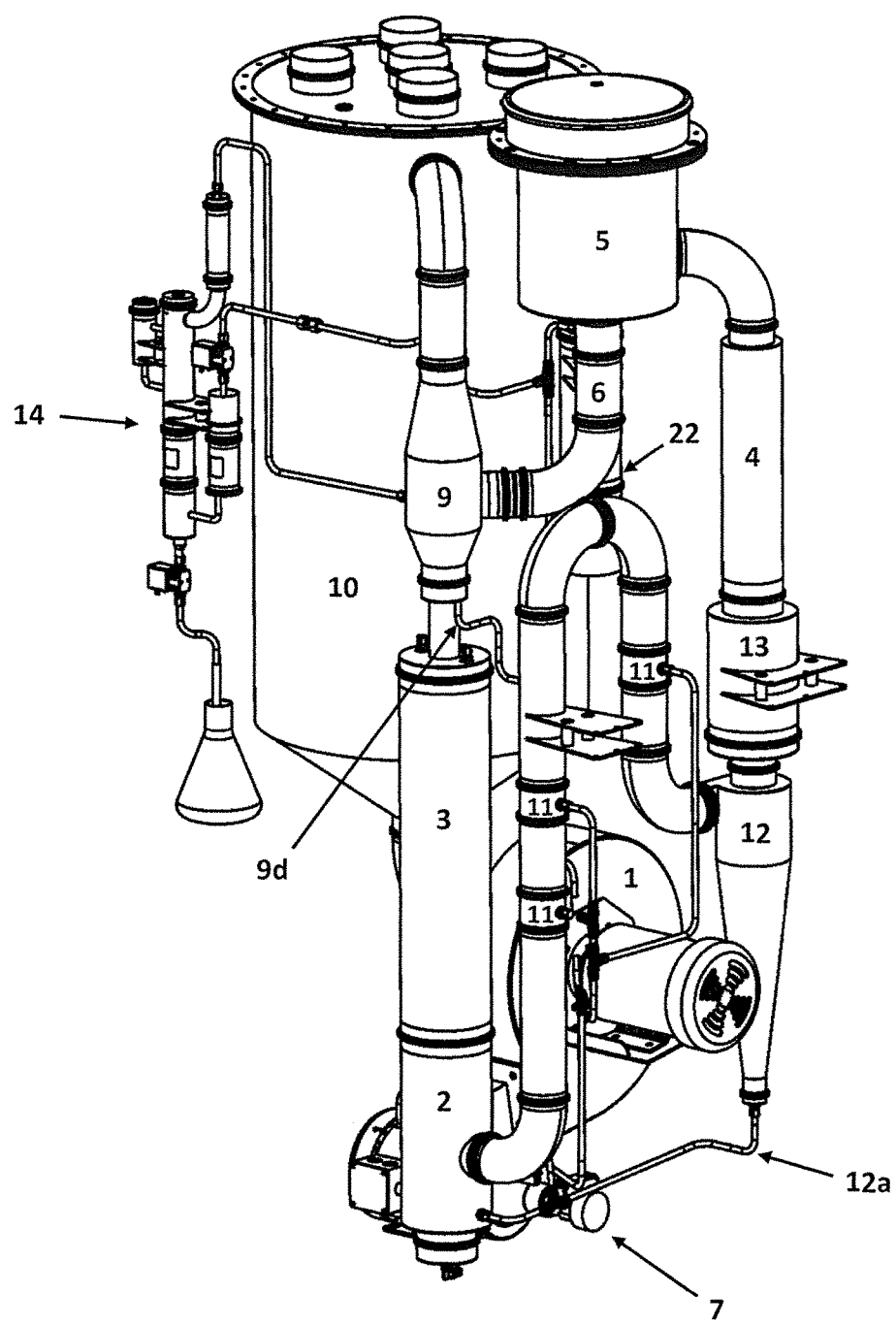
FIG. 2 is a perspective view of the internal components of the first embodiment of the invention illustrated in FIG. 1.
Figure 3:
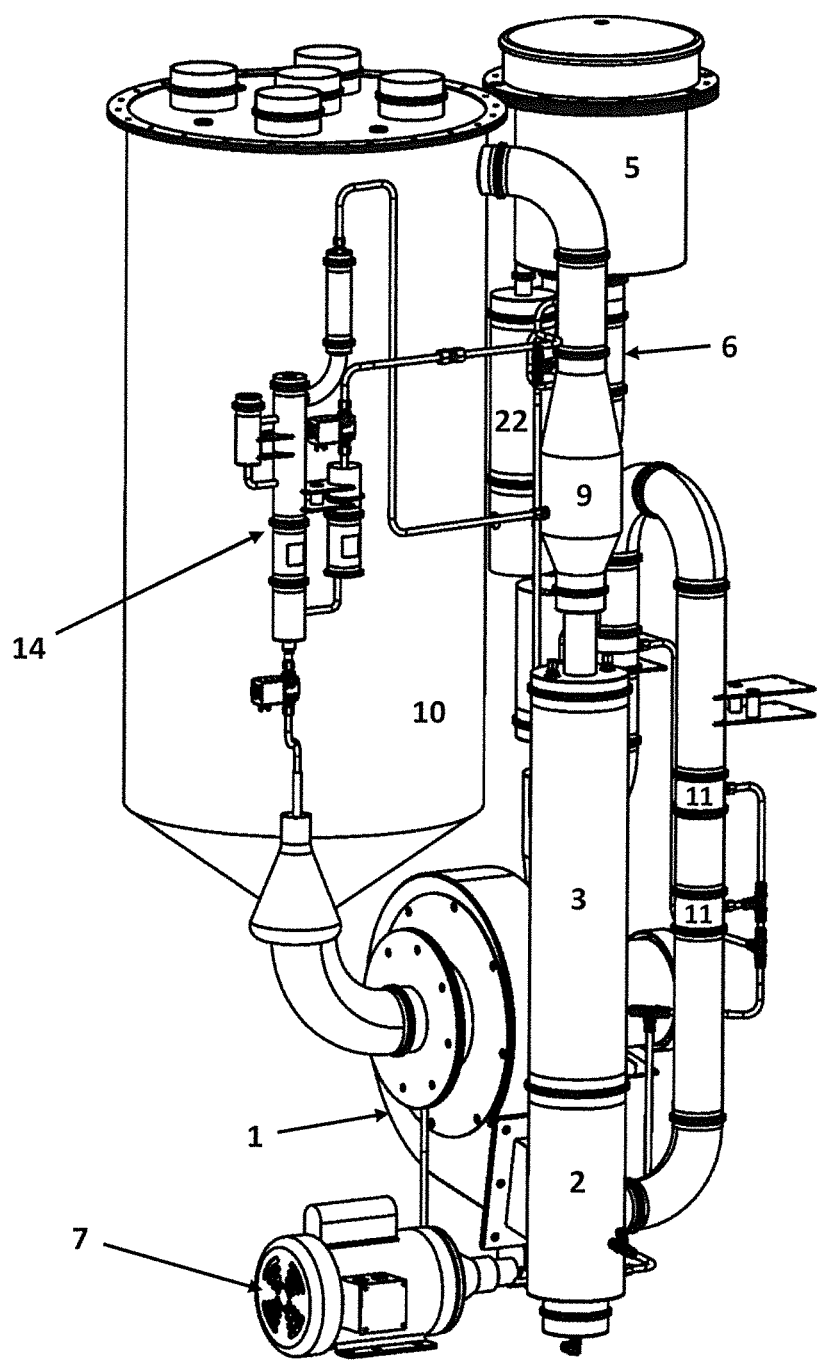
FIG. 3 is a perspective view of the internal components of the first embodiment from another angle.

Due to the volume of air and/or inert gas contained in the gas stream and certain closed components of embodiments of the invention, the fact that the gas is subjected to regular heating and cooling, and because in some embodiments the user will need to open and close the system during operation, a means of equalizing the internal pressure of the system with the external environment is required to minimize the escape of vapors into the surrounding atmosphere. To address this need, a breathing device 22 has been included in a section of the system that is most likely to have the cleanest/free of oil vapor gas stream. This breathing device 22, which can be viewed in FIGS. 1, 2, and 3, provides a link to the outside atmosphere to prevent over pressurization or development of a vacuum within undesired areas of the system. The breathing device 22 may include a chamber of activated charcoal or similarly appropriate material to absorb any oil vapors that may escape from the system during breathing. The exit of the breathing device may be fitted with a duct (not shown) that vents through the back of the system to a location where any escaping oil and solvent vapors will not pose a problem for the operator. As a substitute for this design, a pressure accumulator bladder 22 of appropriate capacity and materials may be used.

Introduction and Removal of Collection Solvent

Collection solvent may be introduced and removed from the main system by a self-priming solvent introduction/removal pump 23. This pump 23 may be manually controlled, or preferably is controlled by a control system that includes a level sensor and servo valves. In the case that the introduction/removal pump 23 is automatically controlled, the pump 23 will be connected to a reservoir 24 of collection solvent. If at any time the fluid level in the system drops below a set point, more solvent will be added to the system. Some embodiments of the present invention are designed for transport. When the system must be prepared for transport, a signal is given to the control system by the user and the solvent introduction/removal pump 23 will empty the system of collection solvent back into the solvent reservoir 24. The solvent introduction/removal pump 23 may be connected to the gas/liquid separator in the splitter 2 near the same location as the intake of the system's primary high-pressure pump 7. In a simplified embodiment of the invention that does not include a solvent purification system, the introduction/removal pump 23 may also be used to remove the non-distilled collection solvent containing collected oils from the system. In some preferred embodiments of the present invention, the system is considered to be a closed loop with respect to both the gas stream and the collection solvent. Even if some solvent is added or removed, much of it is recirculated and is therefore considered to be part of a closed loop system. The same is true for the gas stream; some gas may enter or exit the system but most is recirculated and therefore the system is considered closed loop. In alternative versions, the system is not closed loop, but instead open loop and the gas and/or solvent is not recirculated. In an open loop system, it will be preferable to include a cold trap or similar device to collect and prevent excess solvent from being vented into the atmosphere.

Wetted Materials

In order to ensure the purity of the final product, it is preferred that all wetted surfaces within the system be made of food-grade or higher rated materials. The wetted materials in some embodiments of the invention consist of various grades of stainless steel, glass, platinum-cured, medical-grade silicone, FDA silicone, FDA Viton, FDA EDPM, FDA Nylon, FDA butyl rubber, FDA fluoroelastomers, PTFE (Tephlon), Ryton, carbon, activated carbon and graphite; however, similar safe materials may be used in other embodiments.

Portability, Self-Propulsion and Self-Righting Features

Figure 11:
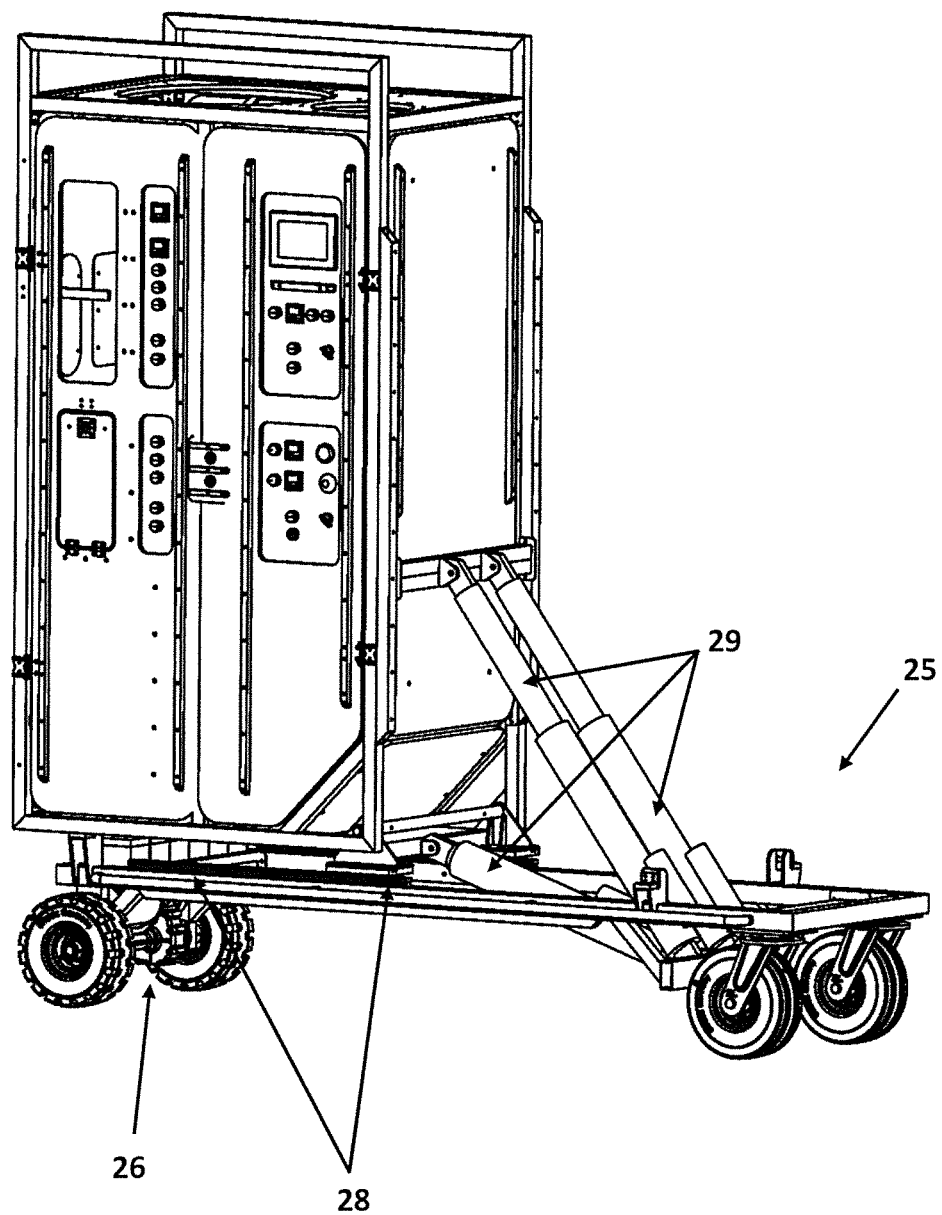
FIG. 11 is a perspective view of an embodiment of the invention mounted on a transport platform with the system positioned upright for processing.
Figure 12:
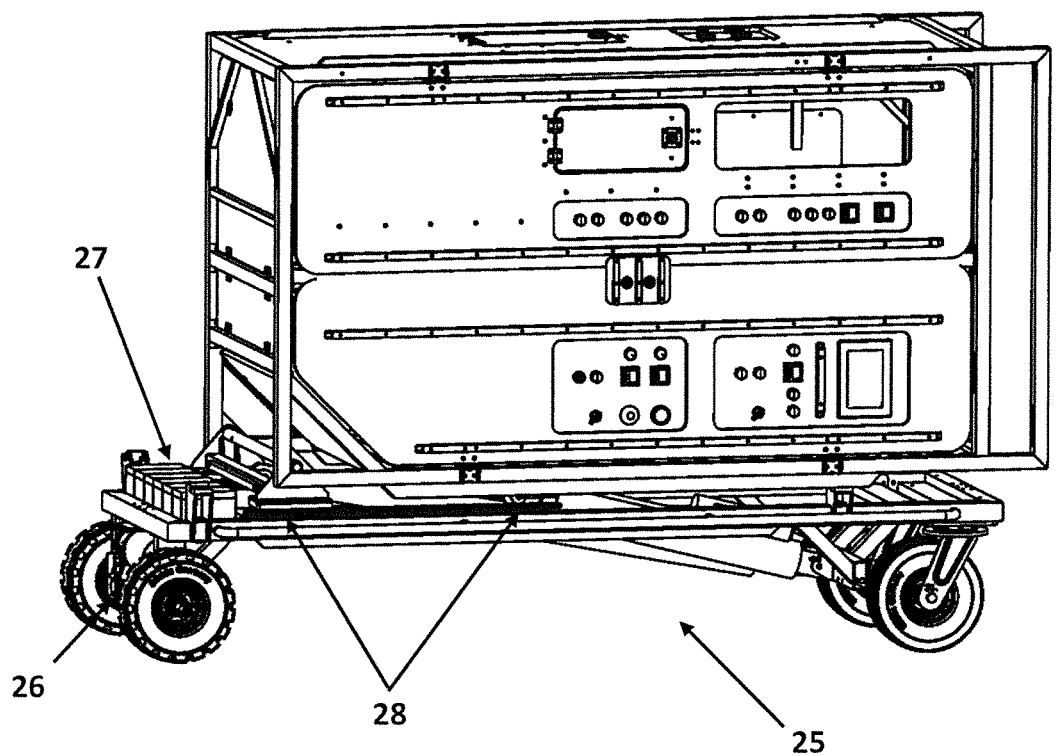
FIG. 12 is a perspective view of an embodiment of the invention mounted on a transport platform with the system folded down for transport.
Figure 13:
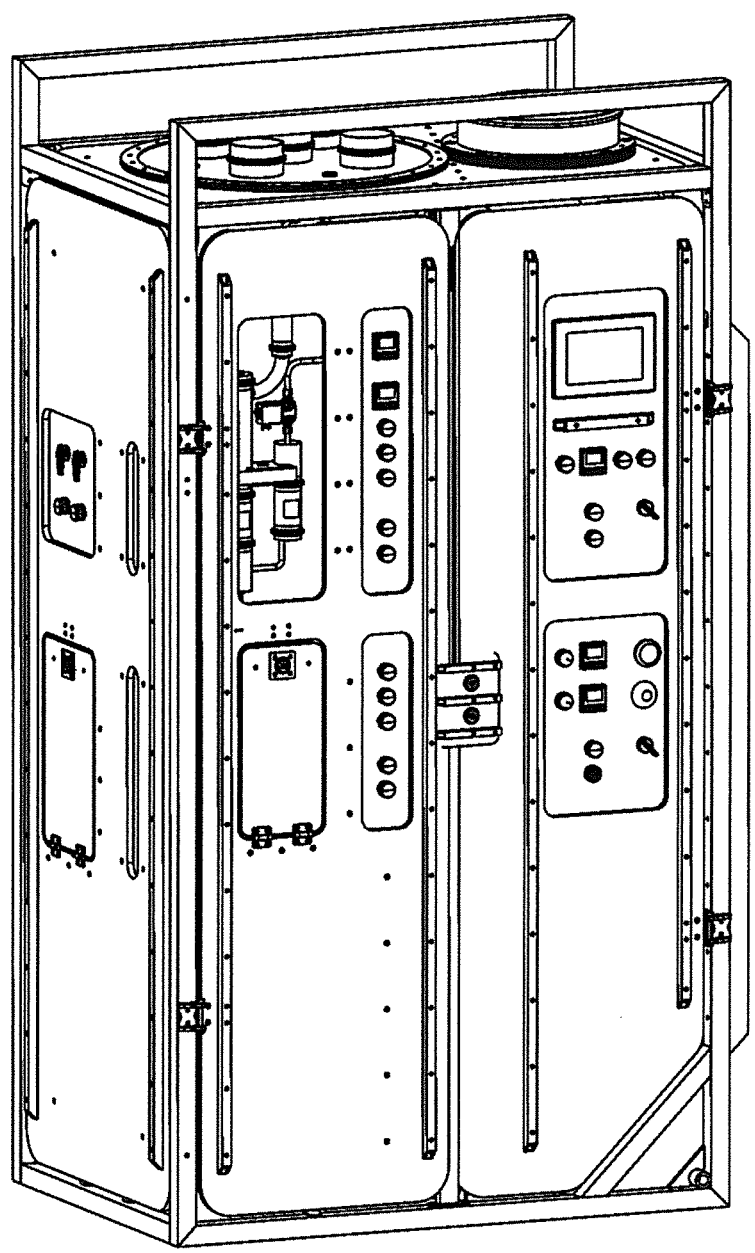
FIG. 13 is a front exterior view of an embodiment of the invention.
Figure 14:
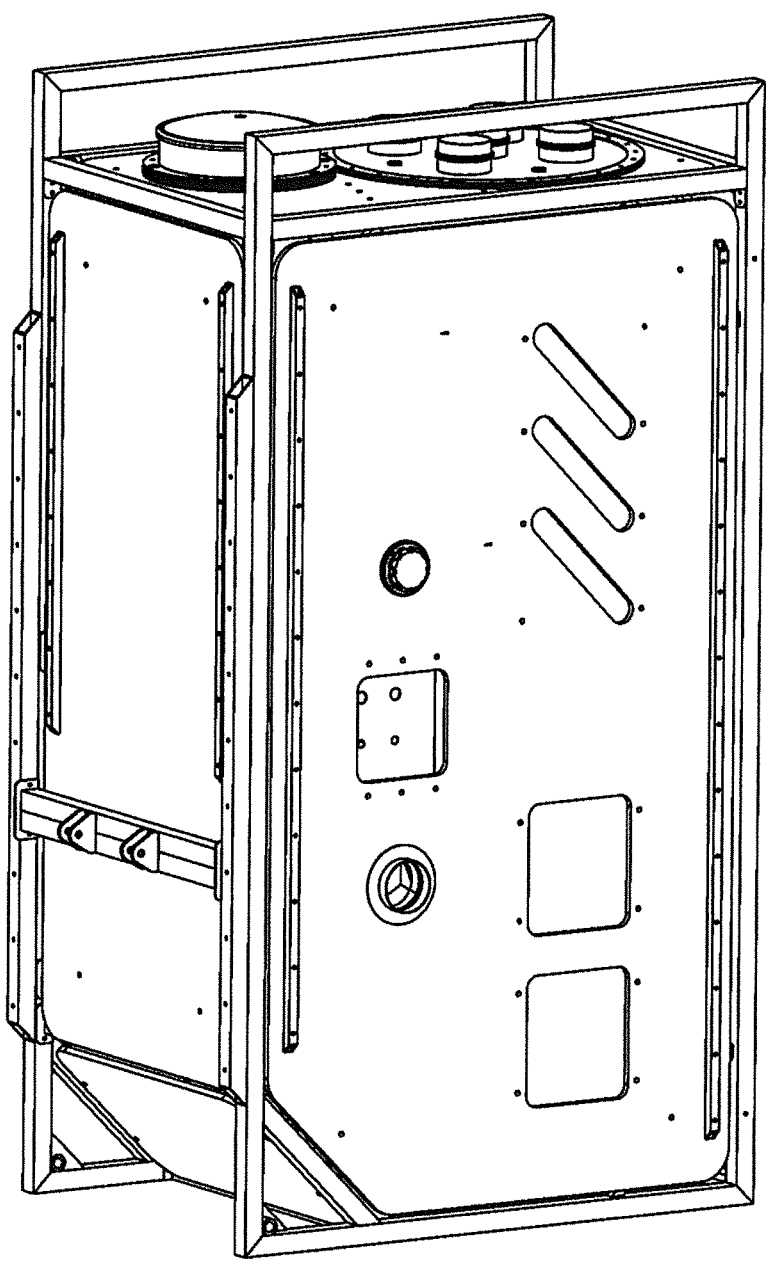
FIG. 14 is a rear exterior view of an embodiment of the invention.

Some embodiments of the present invention are intended to be transported to a location where plant materials are present. As such, portability may be important. A portable system is shown in FIGS. 11 and 12. In order to ensure that even large versions of the system possess a high degree of portability, the system can be mounted on a platform 25 that includes a drive system capable of bringing the system up at least a 30% grade, and a righting system that allows the system to fold down for transport and stand upright for processing. The drive system may include an electric transaxle drive 26 and a bank of batteries 27 to power the drive. The drive system may be controlled by the user via a handheld control (not shown) or other means.

The righting system may include a linear slide track 28 and linear actuators 29 to stand the system upright for operation and fold it down for transport. The linear slide track 28 is an important feature to minimize the length of the platform 25 so as to allow easy entry into buildings and allow transport in regular cargo vans or truck beds. The linear actuators 29 are preferably electrically controlled and able to run off the same battery bank as the electric transaxle drive 26.

Gas Stream Saturation and Flammability Limit Safety

Since embodiments of the current invention may contain evaporated forms of flammable liquids, it is important that the flammable vapor to air/gas ratio within the system be maintained at saturation ratios that are considered above the upper flammability limit or below the lower flammability limit. As known to those who are skilled in the art, when the ratio of flammable vapors to oxygen is kept above a certain ratio or below a certain ratio, the mixture becomes impossible to ignite and is considered safe. In the case of ethyl alcohol and air, the mixture of air and ethyl alcohol vapors must contain below 3% evaporated ethyl alcohol vapors or above 19% ethyl alcohol vapors for the mixture to be considered non-flammable. It is therefore a feature of some embodiments of the invention to include a method of ensuring that the proper ratio of solvent vapor to oxygen be maintained, while also taking into account the potential flammability contributions from the vaporized oils that the system is designed to collect.

The four preferred means of maintaining a non-flammable gas stream in the current invention, which may be used in any combination or alone to achieve the desired result, include: 1) a method of circulating the gas stream in the presence of liquid collection solvent for a period of time that is sufficient to ensure that the mixture is too "rich" to ignite, 2) a method of safely warming the solvent containing portions of the system to manipulate the vapor pressure of the solvent such that the mixture becomes too rich to ignite, 3) the direct introduction of solvent vapor to the internal closed loop of the system, or 4) the introduction of an inert or flame suppressing gas to displace the oxygen in the system or otherwise interrupt the ability of the various mixtures to combust. It should be noted that these methods will be most important during the startup phase of the system, and may not need to be employed at all times during operation.

The first safety measure that may be used in embodiments of the invention to ensure that the solvent or oil vapor containing portions of the system remain above the upper flammability limit includes a means of ensuring that the blower 1 and high pressure sprayers 6a, 11a of collection solvent run for a set period of time before power is sent to the gas heater 4 or any other potential ignition sources within the system. In doing so, the mixture of collection solvent and air within the system becomes too "rich" to be ignited by a faulty gas heater 4 or other ignition source, thus adding an additional layer of safety to the system. A means of delaying power to the heater or potential ignition sources may be accomplished with one or more on-delay timers or through a PLC, or preferably both for redundancy.

TA second safety measure includes a means of ensuring that any solvent or oil vapor containing internal components of the system are kept above a certain temperature prior to sending power to any potential ignition sources within the system. By maintaining a certain temperature within the solvent containing portions of the system, the vapor pressure of the solvents utilized, and, therefore, the amount of such solvents that are known to evaporate within a closed system, may be effectively and reliably manipulated. As an example, in cases where ethyl alcohol is used as a solvent, as long as the internal spaces of the system are kept above at least 22.5 degrees Celsius, the vapor saturation in the enclosed spaces can be assured to be above the upper flammability limits for a mixture of ethyl alcohol vapor and air. A preferred means of keeping the vapor containing portions of the system warm enough to ensure safe operation would be to house or enclose at least a portion of the closed loop components of the system within a housing that can be heated by air or other means that pose no risk of providing an ignition point within the solvent or oil vapor containing portions of the system. Another preferred means would be to include jackets around at least a portion of the closed loop components to which warm water or coolant can be introduced to warm the vapor containing portions of the system prior to operation. Another means would be to directly introduce heated solvent vapor to at least a portion the closed loop spaces of the system. Yet another means would be to wrap the system with heated pads. Each of these methods may be accomplished with simple temperature trigger devices, on-delay timers or through PLC controls, or preferably with all methods used in series for redundancy.

A third safety measure includes a means of directly introducing solvent vapor to maintain a safe, non-flammable ratio of solvent vapor to oxygen.

A fourth safety measure includes a means of introducing an oxygen displacing gas, or a type of gas that chemically interrupts the combustion process, to the closed loop portions of the system, thereby rendering the mixture non-flammable.

Other Safety Methods

While ignition of the solvent and oil vapors is highly unlikely, it is nevertheless recommended that the various piping and vessels used in the system be appropriately designed and constructed of strong enough materials to contain an ignition of the solvent or oil vapors contained within the system. It is also recommended that pressure relief means be included in appropriate areas of the system to protect the operator from an over pressurization of the system.

Additional Components

Several control systems, sensors and feedback devices are required for this system to properly function, and may include HMIs, PLCs, IOs, thermocouples, fluid level sensors, PID controllers, on/off delay timers, temperature trigger devices, pressure trigger devices, relays and other devices. Those skilled in the art of process control and systems engineering should be very familiar with the workings of these devices and the locations within the system where they may be included.

Thermocouples or other temperature sensing/trigger devices may need to be placed in the gas stream downstream of the gas heater 4 to provide feedback to control the heater temperature output, immediately after the extraction chamber 5 and before the first high pressure cooling sprayer 6a to monitor changes in temperature that will indicate that the plant materials have completed volatilization of the desired oils. They may also be needed within key sections of the primary process stream to monitor internal temperature and provide feedback to control the cooling system, and within the secondary distillation system 14 to provide feedback to control the heater 4 and to sense when the temperature changes and indicate saturation of the collection solvent, within the coolant lines to monitor coolant temperature, and in other systems and areas of the system as required.

One or more HMI (human machine interface), PLC (programmable logic controller), PID (proportional-integral-derivative), temperature trigger devices, and IO (input-output) controllers, as well as other process controllers may be needed to respond to sensor data and to provide output to control the processes within the system. Appropriate relay devices, which are preferably solid state, should be included to enable the control systems to regulate the various electrical equipment within the system. Solenoid or servo valves or similar devices may be used to direct fluids on demand and as directed by the process control system. Fluid level sensors may be needed to prevent dry running of the pumps and under or over filling of the system. Fluid level sensors may also be needed to signal the various automated valves when to introduce additional oil containing collection solvent into the distillation system 14 that purifies the collection solvent and separates the plant oils. Pressure bypass valves may be needed to protect the pump or pumps from over pressuring the lines. Blow-off/pressure relief valves may be needed in key areas to protect the user in the rare case that the process stream ignites due to a faulty heating element or otherwise over pressurizes. Several layers of heat limit safety switches and control loops may be needed to ensure safety of the system's operators. These may be mechanically or electronically controlled.

Example of a Potential Operation Sequence of the System

A preferred embodiment of the invention is controlled through a number of touch screen HMI and PLC controls, which, in other embodiments, may be replaced with more conventional PID controllers, pushbutton and selector switches or other control means. Conceptual views of the exterior of the machine can be viewed in FIGS. 11, 12, 13 and 14. In these figures, an example of a potential user interface is shown. The invention may be operated as follows:

The system is plugged into a suitable power receptacle.

The coolant lines from the external heat exchanger 3b are connected to the proper inlet and outlet ports on the system such that they are connected to the cooling coils 3a in the gas cooling tower 3.

The system is powered on.

The collection solvent is introduced to the system via the collection solvent introduction/removal pump 23.

One or several of the removable extraction chamber containers 5b are filled with raw plant material and are set aside. Alternatively, a hopper may be filled with plant material and an automatic feed means will be used to introduce and remove plant material from the extraction chamber 5.

When the system is in an upright position, the extraction chamber 5 is opened. The first removable container 5b is inserted into the extraction chamber 5 and positioned on the cone 5e such that a light seal is achieved between the cone and the removable container 5b. The extraction chamber 5 is closed and the lid is tightly sealed.

The desired temperature setting is selected on the HMI or PID display to isolate the desired oil constituents of the plant material. Depending on the setting, multiple oil compounds may be distilled at the same time, or successive extractions may be performed to isolate and remove specific compounds from the plant material.

The extraction process is initiated.

The system runs for a preset period of time.

When the system has processed for the preset time period, processing ceases and the system enters a brief cool down phase.

When the system has cooled and it is safe to open the extraction chamber, the user is alerted with a visual and/or audible cue.

The user removes the removable container 5b of distilled plant material and sets it aside. If other plant oils need to be individually isolated, this can be performed at a later stage.

This process is repeated as required by the user.

As the system operates, the collection solvent is purified and the plant oil is concentrated in the boiler section 14a of the solvent purification system 14.

When the boiler section 14a becomes saturated with plant oil, the user is notified via a visual and/or audible cue. The current processing cycle is completed and no new processing cycles are begun until the system has undergone a purge cycle.

The user allows the system to go through a full purge cycle of a preset period of time. When the purge cycle is completed, the user is notified.

The user opens the valve at the bottom of the boiler section 14a of the purification system and the final product is removed from the system. In some embodiments of the invention, this will be removed as a purified oil, substantially free of collection solvent.

At this time, the cycles may be repeated, or, if the user desires, the processed plant material that was previously set aside may be processed again at a different temperature setting to remove other compounds from the plant material.

When processing and purging are complete, the remaining collection solvent is removed from the system via the collection solvent introduction/removal pump 23.

Additional Embodiments

The methods of oil extraction and collection according to the invention may also be accomplished through other methods that still fall within the scope of the present invention.

Figure 15:
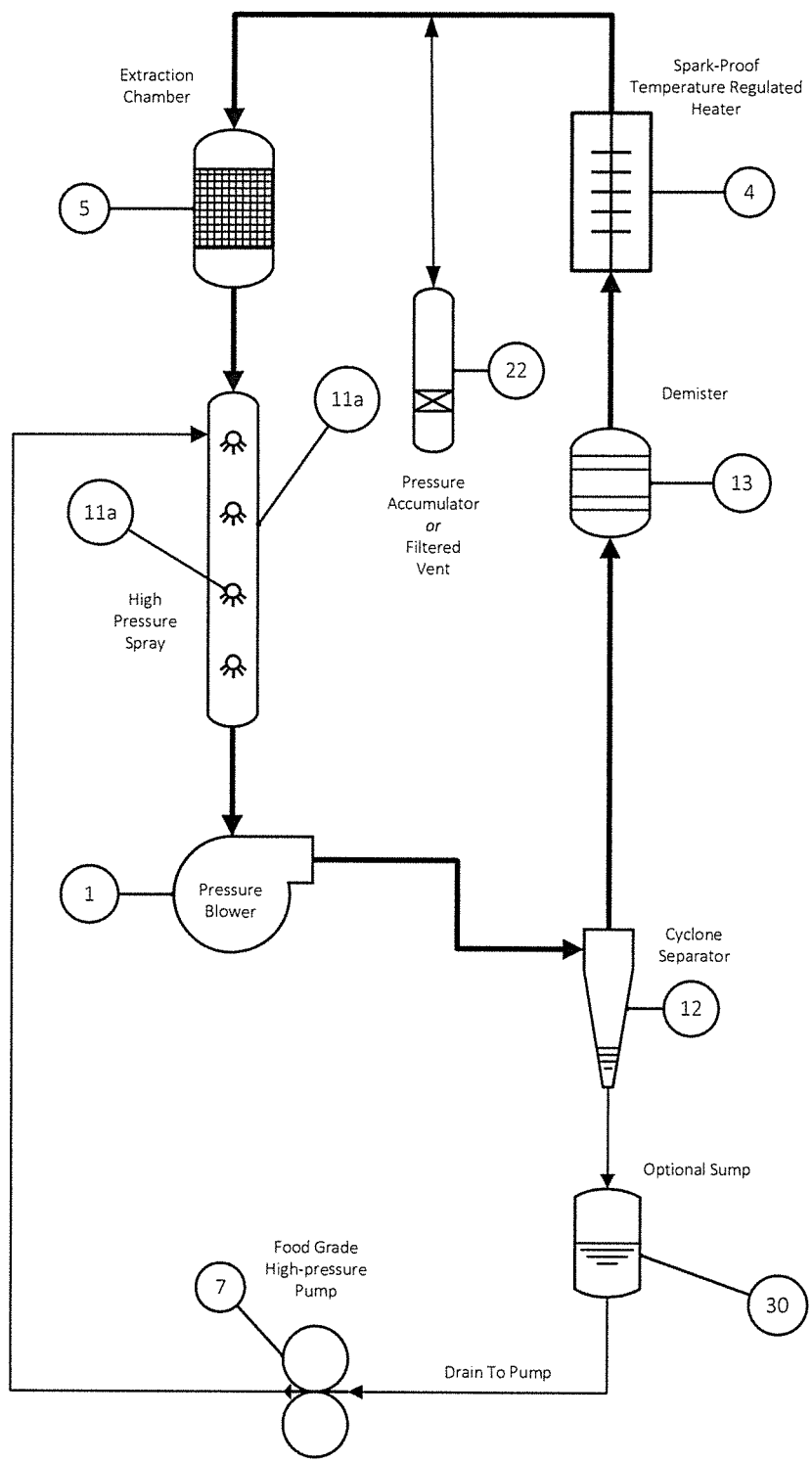
FIG. 15 is a flow-chart diagram of an alternative embodiment of the invention.

Depending upon the application, it may prove beneficial to utilize a more simplified embodiment of the invention as illustrated in FIG. 15. In this simplified embodiment, the primary components used in the system would include a gas moving device 1, a liquid collector such as cyclone particle/droplet separation device 12, optionally a demister 13, a breathing device 22, a heater 4, an extraction chamber 5, and a collection chamber 11 with one or more high pressure sprayers 11a to cause a liquid to contact the gas stream, for both rapid cooling and collection purposes as discussed throughout this disclosure. Also included in this simplified system may be another liquid vessel such as a sump reservoir 30, to which the collected oils and liquid from the sprayers drains, and a high pressure pump 7 to provide pressure to the high pressure sprayers 11*a*. These systems, while simplified, would function in a substantially similar manner to those that are described for the preceding embodiments of this invention and may incorporate features from all embodiments as required.

Figure 16:
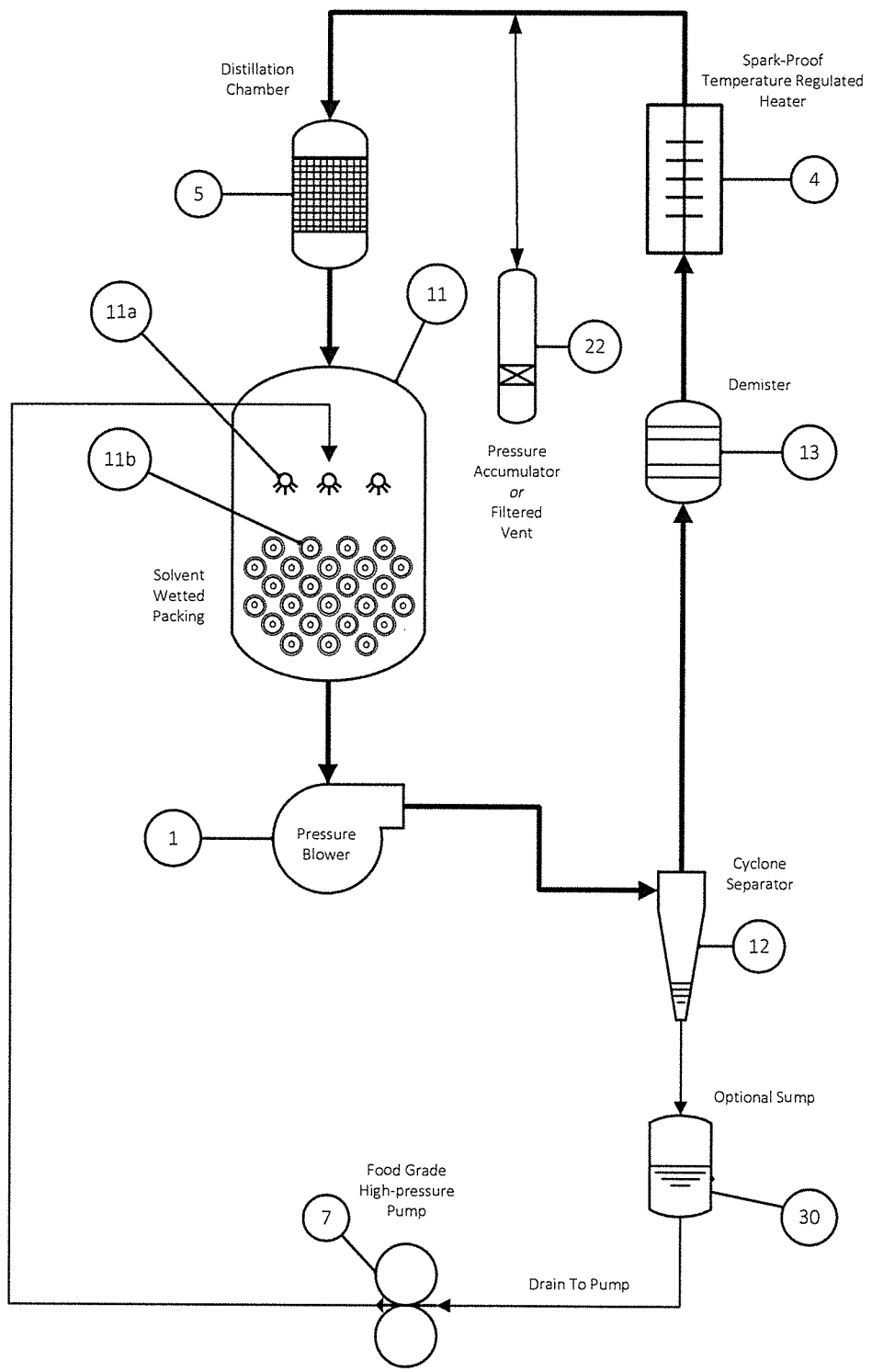
FIG. 16 is a flow-chart diagram of an embodiment of the invention that makes use of a wetted packing material.

Referring to FIG. 16, in some cases, more efficient collection of the volatilized oils may occur through the utilization of a wetted packing material 11*b*. Such an embodiment may include a collection chamber 11 containing a wetted substrate 11*b* such as, but not limited to, random packing including raschig rings, saddles and beads and structured packing including knitted packing, woven wire mesh, stainless steel wool, stainless steel matting, woven stainless steel mesh, corrugated metal sections, bubble-cap plates and sieve tray plates or structured packing to capture the volatilized plant oils. The packing material 11*b* would be wetted with a liquid or collection solvent, which would collect the plant oils and drip down to a sump area to be recovered and collected. In FIG. 16, the packing material 11*b* may be wetted by the sprayers 11*a* or by other approaches. In FIG. 16, the collection chamber 11 may also serve as the cooling chamber, with the sprayers 11*a* and/or packing material 11*b* serving to cool the gas stream. Alternatively, a separate cooling chamber may be provided upstream of the collection chamber 11. A collection chamber with a wetted packing material 11*b* may be used in other embodiments in various locations in the system, such as in place of or in conjunction with the collection chamber 11 in FIG. 1.

Figure 17:
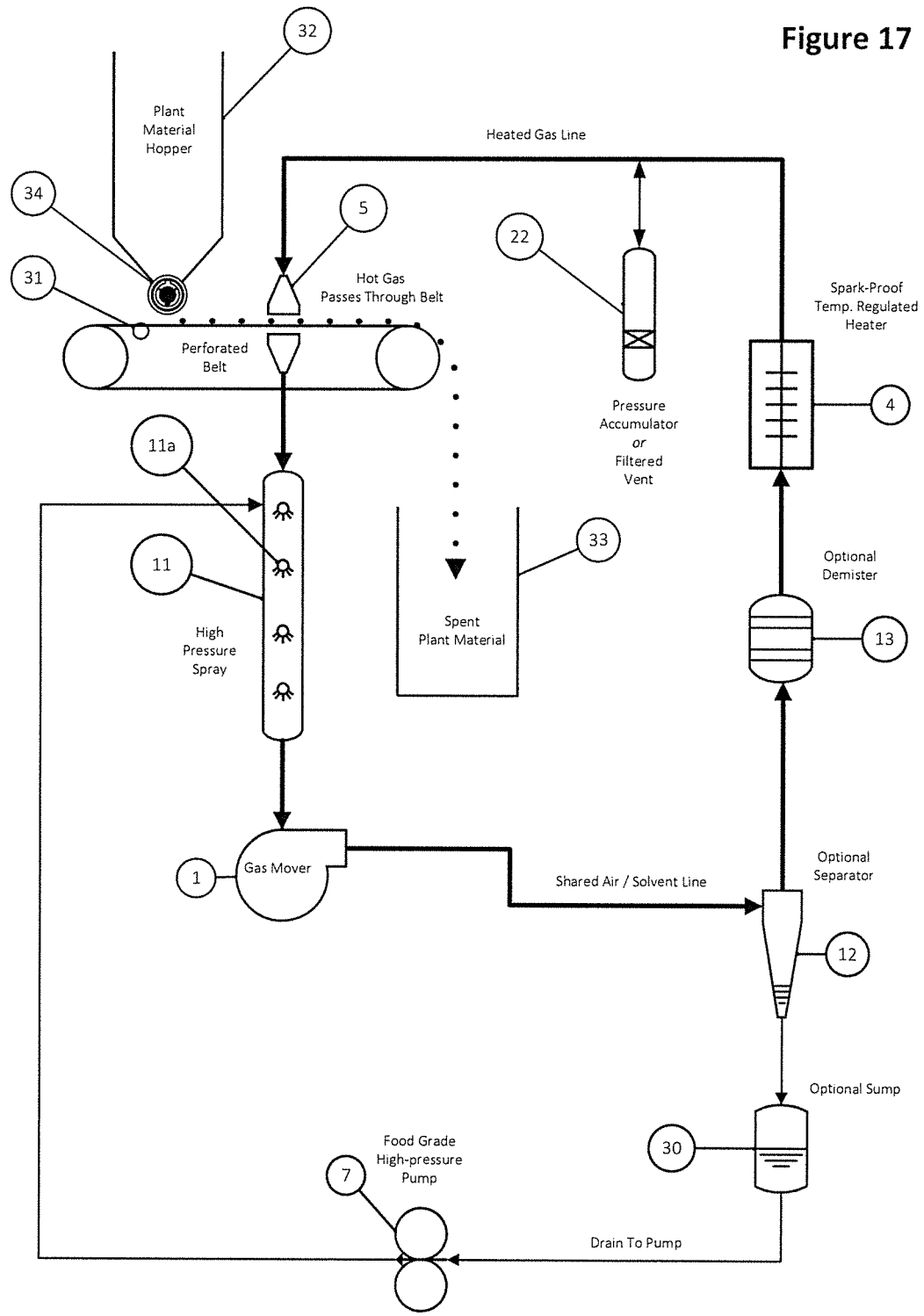
FIG. 17 is a flow-chart diagram of an embodiment of the invention that uses an automatic continuous feed system to both accelerate processing time and ensure that the plant material is exposed to heat for a minimal period of time to prevent heat degradation of the plant oils.

FIG. 17 illustrates another embodiment of the invention that includes a continuous feed/conveyor mechanism 31 that carries plant material from a hopper section 32 of the system to a location where it contacts a heated gas stream. After contacting the gas stream, the plant material, mostly depleted of its oils, is carried to a spent plant material deposit area 33 where it is collected for disposal. A continuous feed mechanism will be highly beneficial to accelerate the speed and efficiency by which the system operates. It is also important to note that such a design will improve the quality of the oils collected by minimizing the time during which the plant material is exposed to heat. As illustrated in FIG. 17, the feed mechanism in this embodiment is a perforated/screen belt 31 that feeds plant material through the system. A layer of plant material is distributed on the perforated belt 31 and the heated gas stream is passed through the plant material to cause the oils within the plant material to volatilize and become entrained in the gas stream. The volatilized oils entrained in the gas stream are then condensed and collected according to the various methods described in this disclosure. The embodiment illustrated in FIG. 17 may also include an apparatus 34 for grinding, portioning and distributing the plant material exiting the hopper 32 to the desired size, portion, and distribution for optimal operation of the system. It should be known that while a perforated belt 31 is suggested to facilitate the gas stream passing through the layer of plant material, it may also be possible to simply have the heated gas stream pass over the plant material without being driven through the perforated belt to achieve a similar result. This is also true of any other embodiment herein; instead of passing the heated gas stream through the plant material, the plant material may instead be exposed to the heated gas stream in various ways. However, passing the gas stream through the plant material is preferred for some embodiments.

Since some solvent vapors from the closed system may enter both the hopper 32 and spent plant material deposit areas 33, it may also be beneficial in this embodiment, and those that are similar, to displace the oxygen in the hopper 32 and spent plant material deposit areas 33 by use of a non-combustible gas or to otherwise employ a similar means to those proposed in previous sections of this disclosure whereby enclosed areas of the system are kept above the upper flammability limit or below the lower flammability limit of the solvents used within the system.

Preferred Rapid-Distillation Extraction Chamber Embodiments

In many applications, the plant oils being extracted may be especially sensitive to heat. Therefore, providing an extraction chamber that minimizes the time that the plant materials are exposed to the heated gas stream will be especially beneficial to preserve the quality of the oils being extracted. The following extraction chamber embodiments include continuous feed methods that minimize the time that the plant material is exposed to the heated gas stream, with an added benefit of greatly reducing processing time. The time that the plant materials are exposed to heat may be adjusted or configured to be as long or short as needed, however, certain times are preferred. In cases where the embodiments are configured to perform a single extraction of the oils from the plant materials, it is preferred that the time that the plant material is exposed to the heated gas stream be limited to a period that is greater than 15 seconds and less than 135 seconds. In cases where multiple extractions are performed in series, it is preferable that the plant material be exposed to the heated gas stream for greater than 15 seconds and less than 75 seconds per extraction pass.

Figure 18:
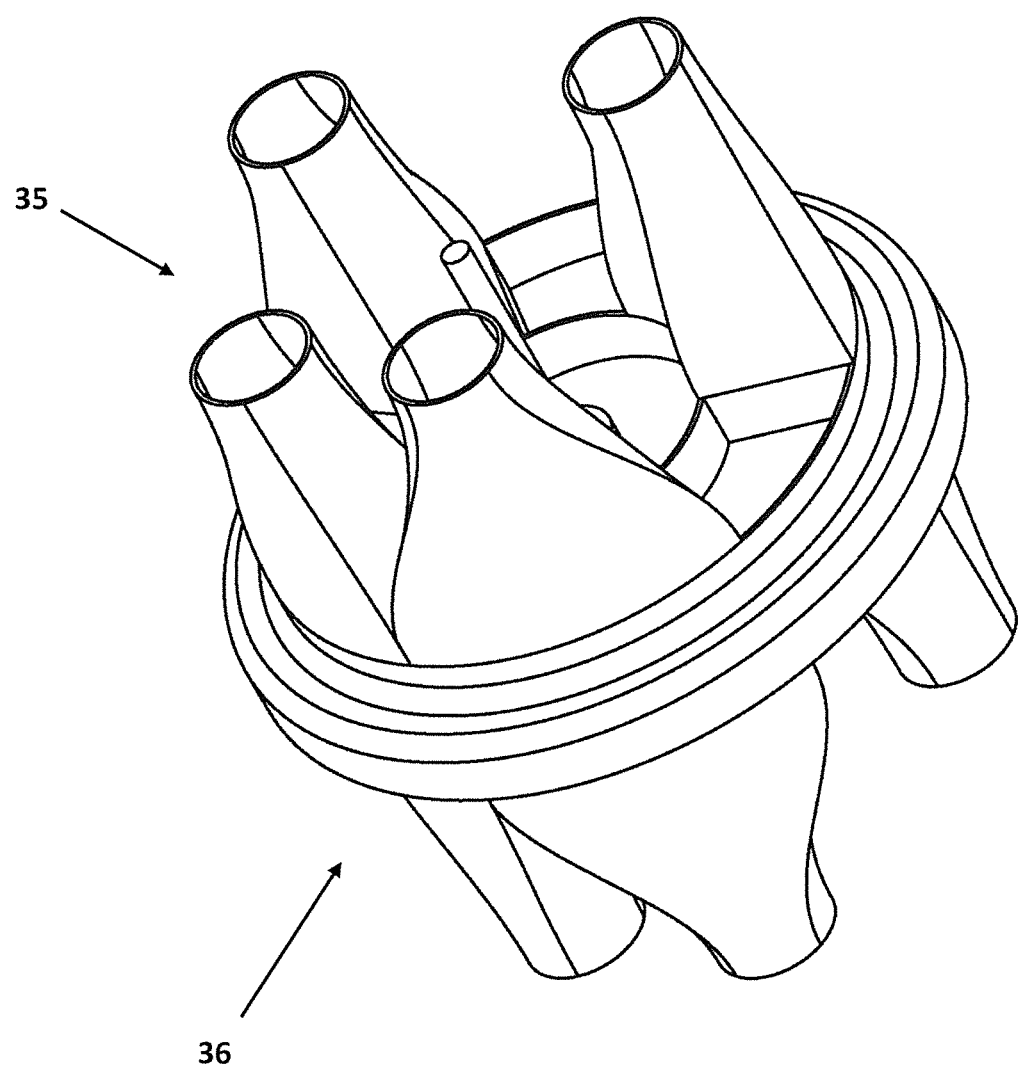
FIG. 18 illustrates a perspective view of another embodiment of an extraction chamber wherein a conveyor disk is used to automate the extraction process and ensure that the plant material is exposed to heat for a minimal period of time to prevent heat degradation of the plant oils.
Figure 19:
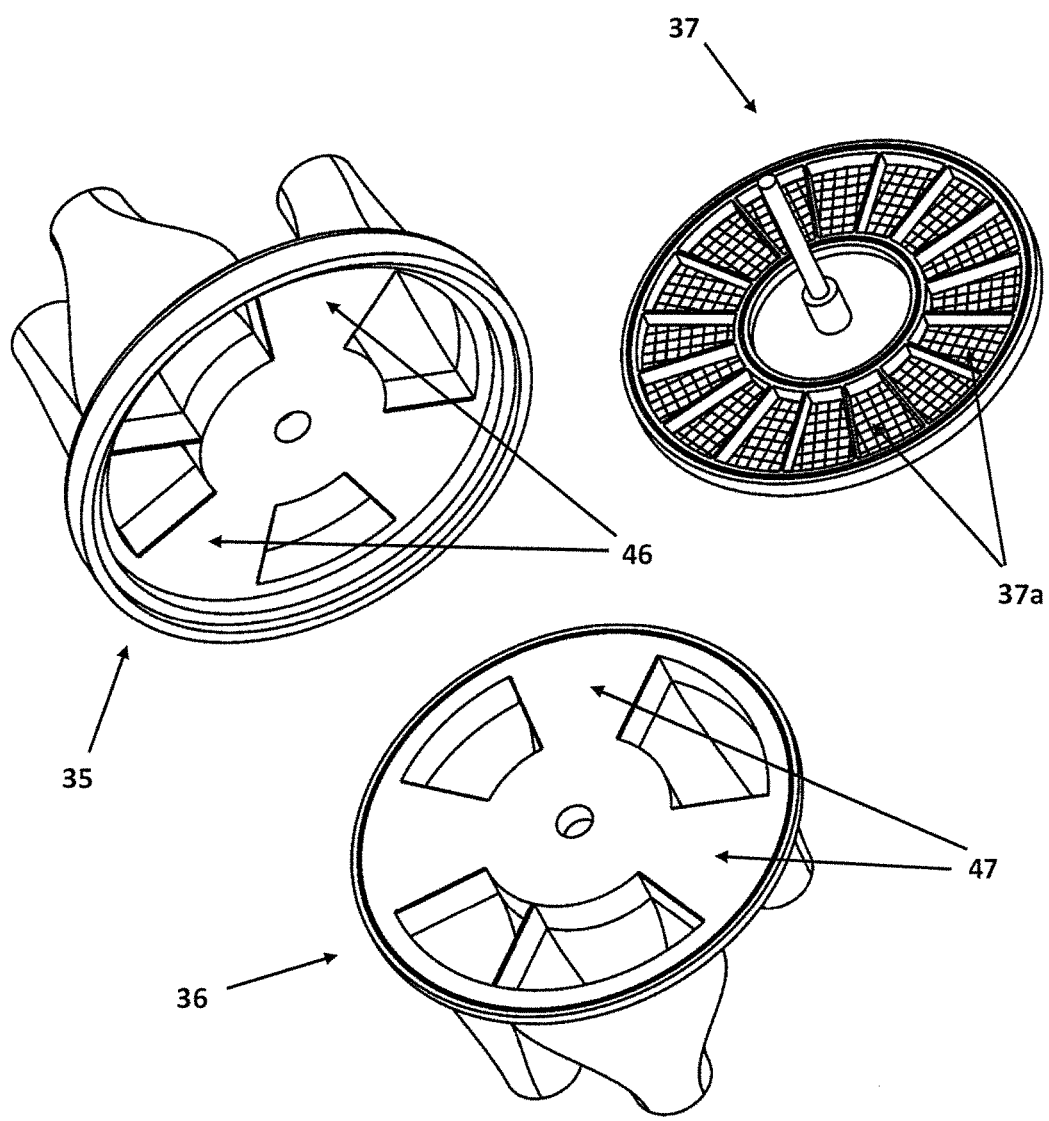
FIG. 19 is a disassembled view of a extraction chamber of FIG. 18.
Figure 20:
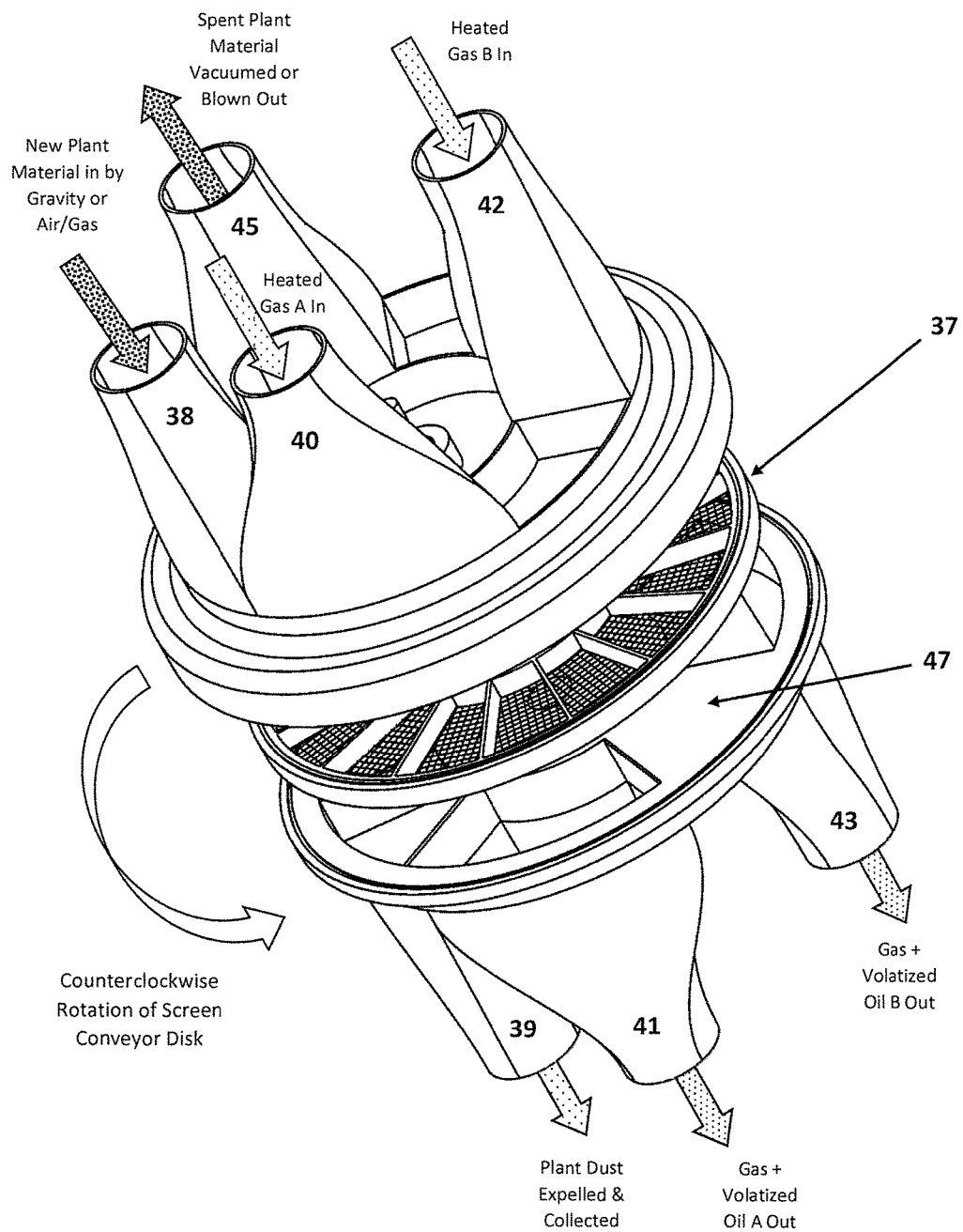
FIG. 20 is an exploded view of the embodiment of the extraction chamber of FIGS. 18 and 19 with gas flows labeled.

FIG. 18 illustrates an assembled view of a preferred embodiment of the extraction chamber 5 to be utilized in some embodiments of the collection system. FIG. 19 illustrates a disassembled view of the extraction chamber 5, depicting an upper section 35 and a lower section 36 of a housing, and a rotatable screen or otherwise perforated conveyor disk 37 disposed in the housing and having slotted compartments 37*a* to convey plant materials to the various sections of the extraction chamber 5. FIG. 18 illustrates an exploded view of the extraction chamber 5, again depicting an upper section 35 and a lower section 36, and a rotating, slotted perforated conveyor disk 37 to carry plant material to various sections within the extraction chamber 5. A first inlet passage 38 allows new plant material to be distributed on the rotating conveyor disk 37, and a first outlet passage 39 allows dust from the new plant material to be collected. A second inlet passage 40 allows a heated gas stream of a first temperature to be passed through the plant material, and a second outlet passage 41 allows the volatilized plant oils in the gas stream of a first temperature to exit. A third inlet passage 42 allows a heated gas stream of a second temperature to be passed through the plant material, and a third outlet passage 43 allows the volatilized plant oils in the gas stream of a second temperature to exit. A fourth inlet passage 44 (entering from the bottom section of the extraction chamber 5 and traveling upwards) allows forced air to be blown up through the bottom of the conveyor disk 37, and a fourth outlet 45 allows the spent plant material to be removed from the extraction chamber 5 with the assistance of the forced air. Included between the various inlet and outlet sections are approximately flat dividing sections 46, 47 on both the upper 35 and lower 36 sections of the extraction chamber 5 (these are also illustrated in FIG. 19).

Figure 21:
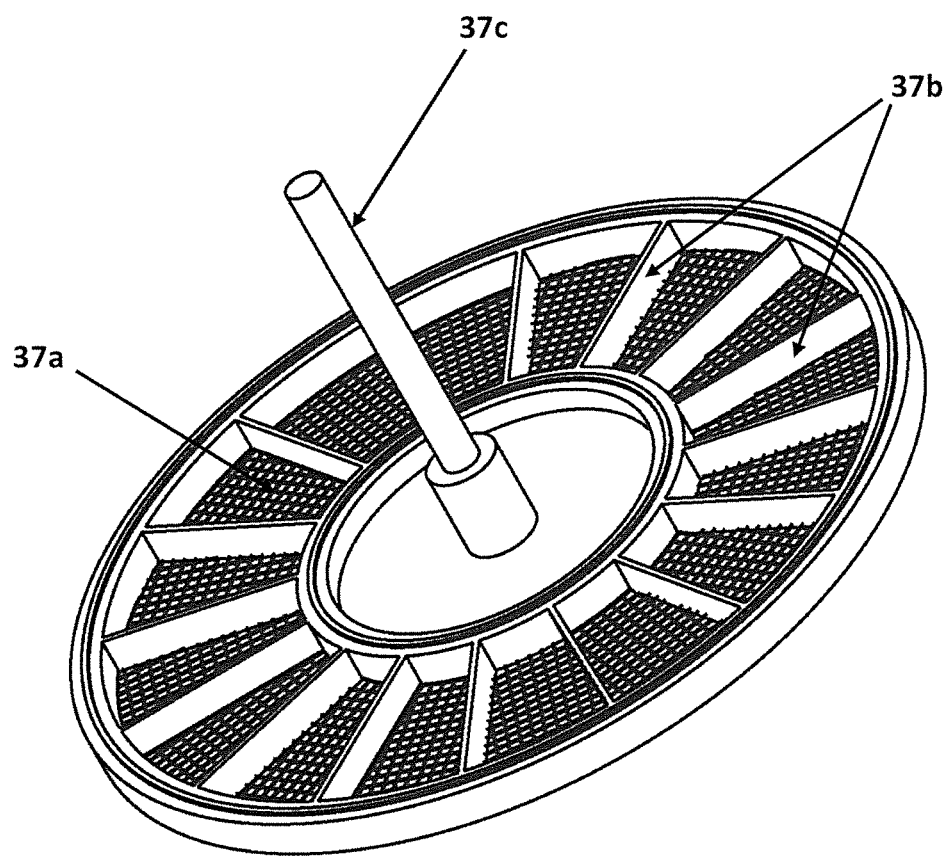
FIG. 21 is a detailed view of a rotatable conveyor disk.
Figure 22:
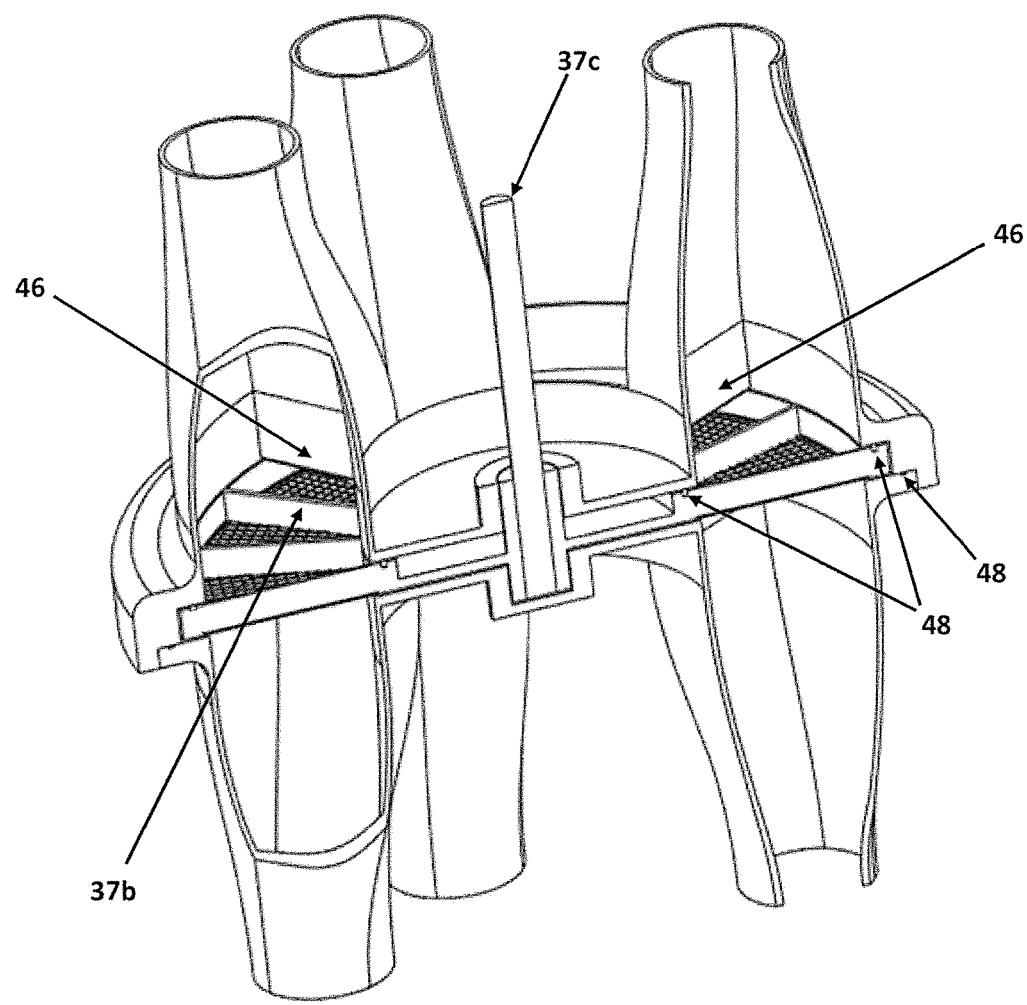
FIG. 22 is a cross-sectional view of the extraction chamber of FIGS. 18-20.
Figure 23:
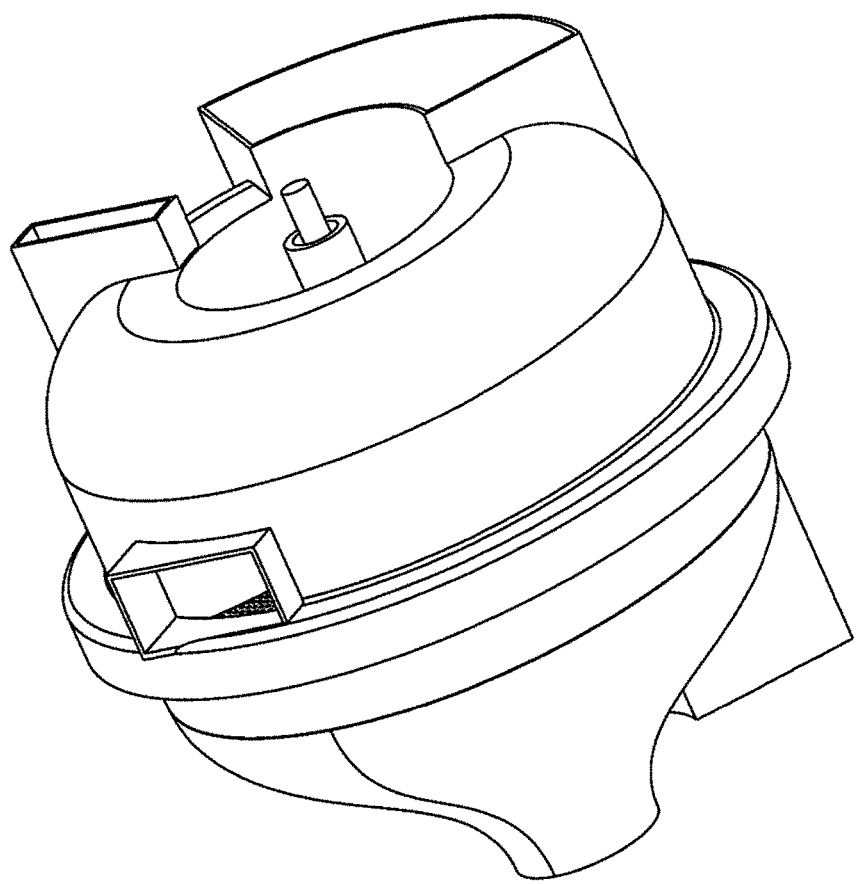
FIG. 23 is a perspective view of an alternative embodiment of the extraction chamber wherein a conveyor disk is used to automate the distillation process and ensure that the plant material is exposed to heat for a minimal period of time to prevent heat degradation of the plant oils.

The upper dividing sections 46 are designed to nearly contact the raised dividing edges 37b of the slots 37a of the conveyor disk 37, thereby aiding in the isolation of the separate sections of the extraction chamber 5. The lower dividing sections 47, which approximately mirror the features of the top dividing sections 46, are designed to nearly contact the bottom portion of the conveyor disk 37, so as to also aid in the isolation of the separate sections of the extraction chamber 5. The slots 37a in the conveyor disk 37 are spaced appropriately such that each of the flat areas of the upper dividing sections 46 remain in near contact with at least one of the raised dividing edges 37b of the slots 37a in the conveyor disk 37 to ensure that the extraction chamber 5 sections always remain substantially divided regardless of the rotational position of the conveyor disk 37. FIG. 21 illustrates a detailed view of the conveyor disk 37 whereby the raised edges 37b of the slots 37a can be clearly seen. FIG. 22, which is a cross section view of the extraction chamber 5, illustrates how the raised edges 37b of the slots 37a interface with the upper and lower dividing surfaces 46, 47 of the extraction chamber 5. The rotating conveyor disk 37 includes O-ring groves 48 to accommodate temperature appropriate seals to prevent any of the gas streams or forced air from attempting to pass around the edges of the conveyor disk 37 and bypass the plant material. The upper 35 and lower 36 sections of the extraction chamber 5 also include O-ring groves 48 to accommodate a temperature appropriate O-ring seal to seal the extraction chamber 5 from the surrounding atmosphere and maintain a closed system.

During operation of the system, the conveyor disk 37 in this embodiment slowly rotates, either continuously or intermittently, in a counterclockwise direction. The conveyer disk 37 may be driven by a motor, belt or other means via a sealed shaft 37c that exits the extraction chamber 5. New plant material is introduced to the extraction chamber 5 through the first inlet passage 38, and fills each slot of the conveyor disk 37 as the disk rotates. The new plant material preferably originates from a hopper 32, and enters via a grinder/dispenser 34 that also ensures that the plant material is ground to the proper size to allow for optimal operation of the invention. Upon entry, excess plant dust particles pass through the screen in the conveyor disk 37 and exit through the first outlet passage 39 of the extraction chamber and into plant dust deposit container (not shown). As the conveyor disk 37 rotates, the new plant material is smoothed into the slots 37a of the conveyor disk by the first upper dividing section 46 and rotated into a section of the extraction chamber 5 where a heated gas stream of a first temperature is passed through the plant material via the second inlet passage 40, causing any oils or volatile compounds within the plant material that have boiling points that are equal to or lower than the temperature of the gas stream of a first temperature to be volatilized and carried out of the chamber through the second outlet passage 41 of the extraction chamber 5. As discussed earlier, some oils with higher boiling points may also be volatilized.

After exiting the extraction chamber 5, the plant oil vapors in the gas stream of the first temperature are captured and collected according to the methods previously disclosed. The conveyor disk 37 continues to rotate and the partially extracted plant materials pass through a dividing section 46, 47 before being rotated into a section of the extraction chamber 5 where a heated gas stream of a second temperature (preferably of a higher temperature than the first gas stream) that enters through the third inlet passage 42 is passed through the plant material, causing any oils or volatile compounds within the plant material that have boiling points that are equal or lower than the temperature of the gas stream of the second temperature to be volatilized and carried out of the extraction chamber 5 through the third outlet passage 43 of the extraction chamber 5. Again, additional oils may be volatilized. After exiting the extraction chamber 5, the plant oil vapors that are entrained in the gas stream of the second temperature are captured and collected by the system, preferably in a second closed system that is isolated from the first. In operating the extraction chamber 5 in this way, two extractions can be performed simultaneously to allow isolation of separate compounds within the plant materials. As the conveyor disk 37 continues to rotate, the plant material, now mostly deprived of its original oil constituents, passes through another dividing section 46, 47 before being rotated into a section where forced air is driven up through the bottom of the conveyor disk 37 through the fourth inlet passage 44, entraining the spent plant material in the forced air and lifting it through a fourth outlet passage 45 in the top section 35 of the extraction chamber 5 to be collected and disposed of accordingly. The spent plant material is collected in a deposit area 33 (see FIG. 17), which is preferably separated from the external atmosphere, but connected to the gas moving device (not shown) that provided the forced air that aided in removal. It should be noted that it is preferred to include a cleaning brush or other cleaning mechanism in this embodiment that contacts the rotating conveyor disk 37 to free any plant material that becomes trapped within the perforations of conveyor disk 37. The location of this cleaning brush would preferably be in the section of the extraction chamber 5 where forced air is introduced to facilitate removal of spent plant materials.

The embodiment of the extraction chamber 5 illustrated in FIGS. 18, 19, 20, 21 and 22 is advantageous for several reasons. It provides an automatic means of feeding new plant material through the system and removing spent plant material that has been substantially depleted of its oils, and thereby automates the oil extraction process. Most importantly, the embodiment minimizes the time to which the plant material is exposed to heat, thereby preventing excess degradation and significantly improving the quality of the collected oils. An additional advantageous feature of this embodiment is that it allows one or more successive extractions of the plant material oils to occur simultaneously, thereby greatly reducing processing time when multiple extractions are desired. The second extraction is optional, and may be omitted in some versions. Alternatively, more than four inlet/outlet pairs may be provided to allow additional processing.

It should be known to those who are skilled in the art that this embodiment may be designed to have only one extraction of the plant materials occur, or multiple successive extractions at the same or different temperatures. In cases where the embodiment is designed to allow multiple extractions to occur, it is preferred that an additional closed oil vapor collection loop be included for each successive extraction section of the extraction chamber 5. Alternatively, the gas streams from both extractions may flow into the same collection loop. It should also be known to those who are skilled in the art that the embodiment may be re-designed such that the rotatable conveyor disk 37 is not perforated and the gas stream is passed over the surface of the plant materials to induce volatilization of the oils within. Such a non-perforated design may facilitate easier cleaning and removal of spent plant materials.

FIGS. 23, 24, 25 and 26 illustrate an additional embodiment of the extraction chamber 5, the functioning of which is similar to the preceding embodiment. The conveyor disk 37 in this embodiment, which is illustrated this time as being rotatable in a clockwise direction, does not include slots and, like the previous embodiment, may be made of several suitable materials including stainless steel or ceramic. In place of the air-assisted removal technique, this embodiment includes a means of directly sweeping spent plant material from the surface of the conveyor disk 37 and out of the extraction chamber 5.

Figure 24:
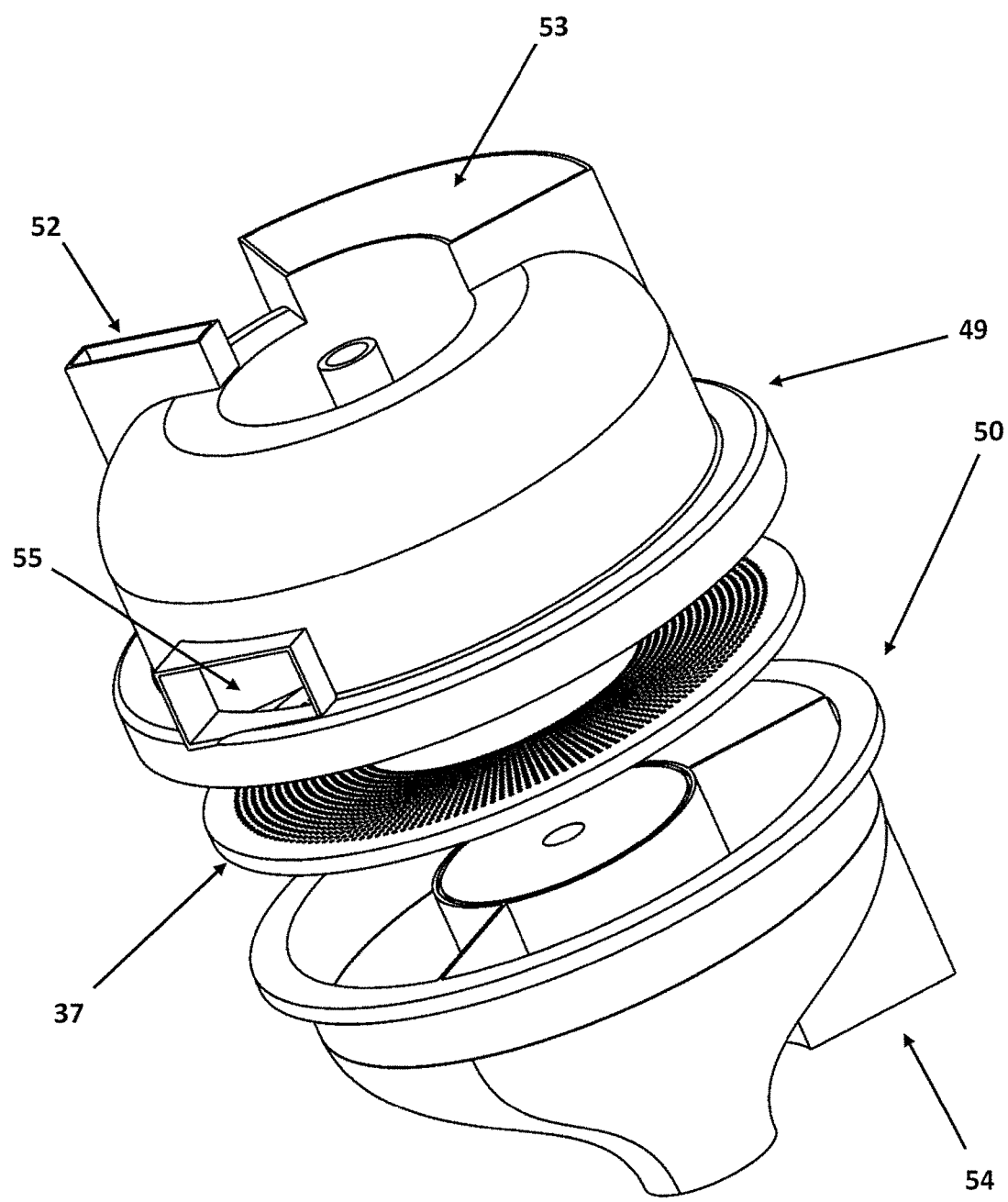
FIG. 24 illustrates an exploded view of the alternative embodiment of the extraction chamber of FIG. 23.

FIG. 24 illustrates an exploded view of the embodiment, which consists of an upper section 49 and a lower section 50, a rotating perforated conveyor disk 37 to carry plant material throughout the various areas of the chamber, a first inlet passage 52 to distribute new plant material on the perforated conveyor disk 37, a second inlet passage 53 to allow a heated gas stream to be passed through the plant material to volatilize the oils contained therein, a first outlet passage 54 to allow the volatilized plant oils in the gas stream to exit, and a second outlet passage 55 approximately perpendicular to the first outlet passage 54 to allow spent plant material to be swept from the perforated conveyor disk 37 and ejected from the oven.

Figure 25:
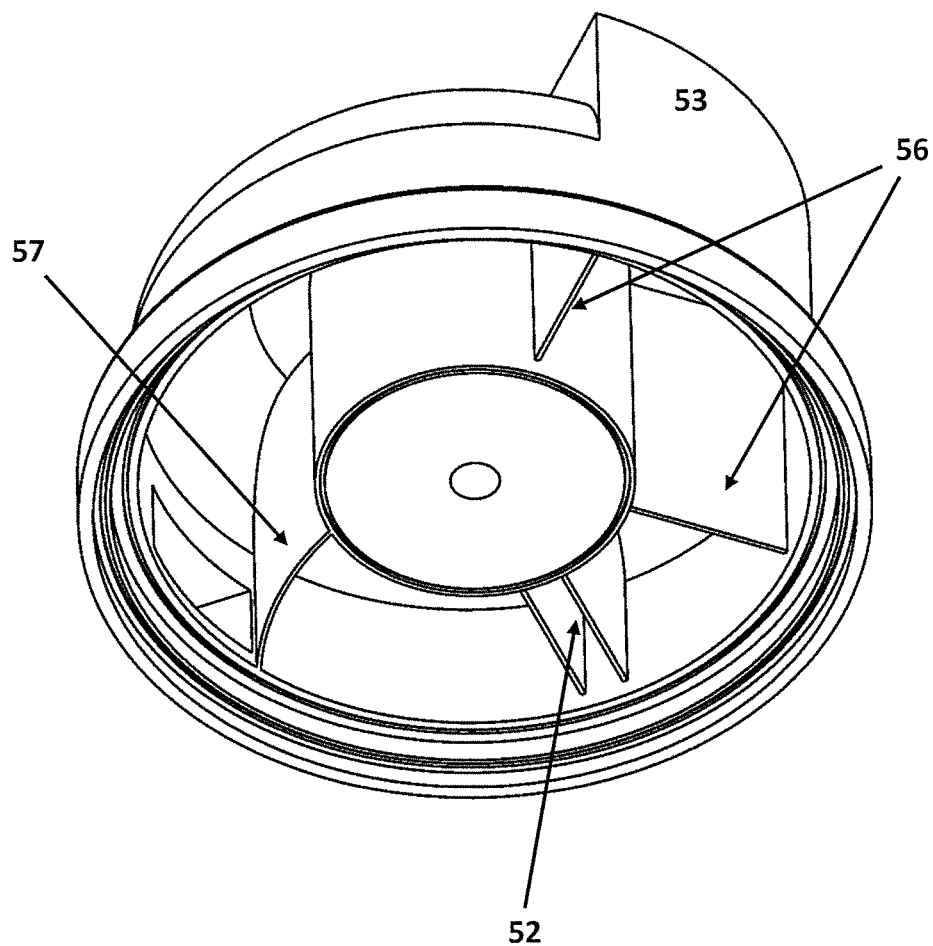
FIG. 25 is a detailed view of a top section of the alternative embodiment of the extraction chamber.

FIG. 25 shows a detailed view of the upper section of the embodiment, illustrating the various section dividers 56 of the extraction chamber 5 and a sweeping section divider 57 that sweeps/scrapes spent plant material from the extraction chamber 5. The upper section 49 of the embodiment consists of a first inlet passage 52 that allows new plant material to enter the extraction chamber 5, section dividers 56 that separate the various sections of the extraction chamber 5, a second inlet section 53 to allow the heated gas stream to be driven through the plant material, and a sweeping section divider 57 that sweeps the spent plant material from the surface of the perforated conveyor disk 37.

Figure 26:
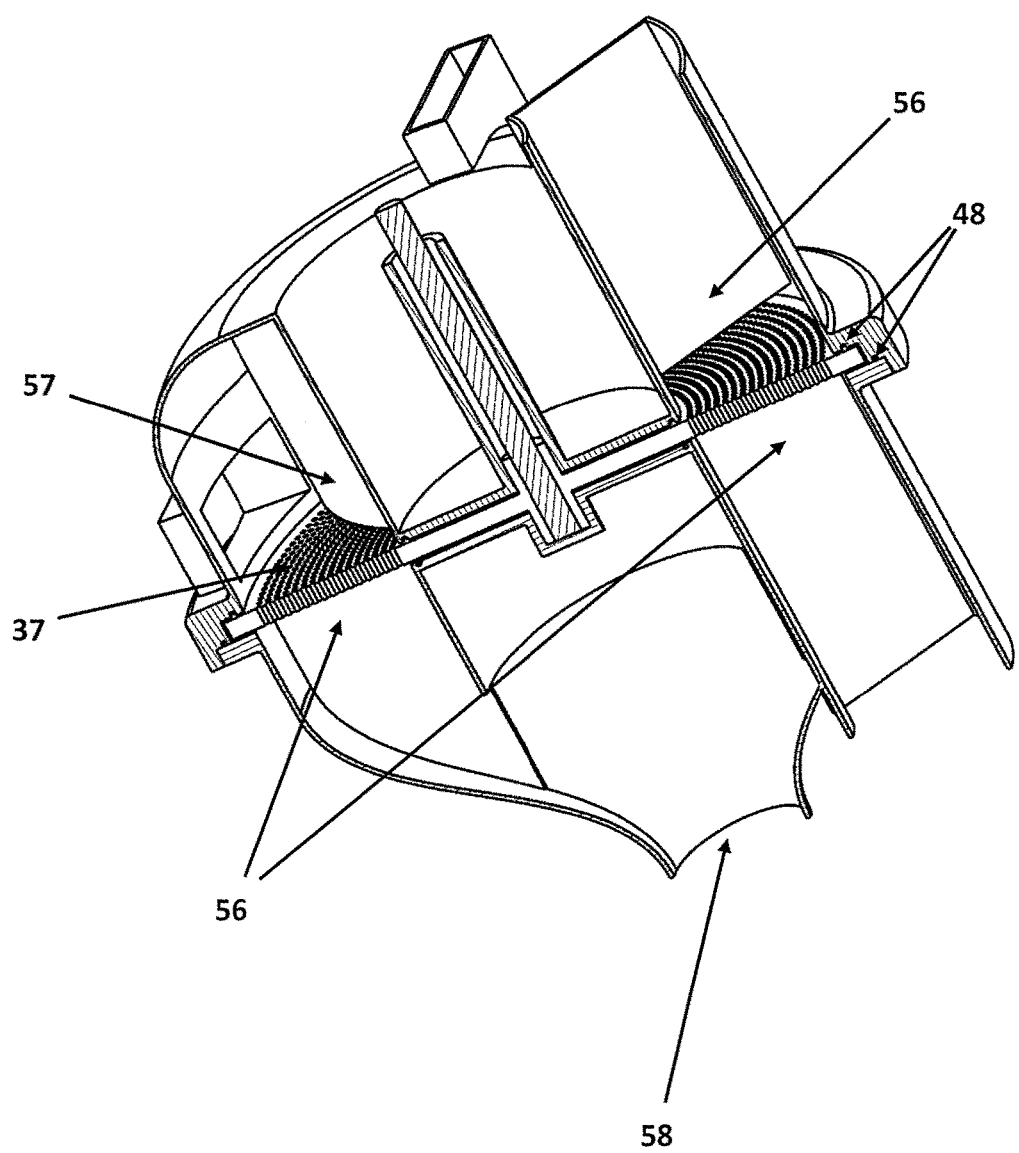
FIG. 26 is a cross-sectional view of the alternative embodiment of the extraction chamber of FIGS. 23 and 24.

FIG. 26 is a cross-section view of the extraction chamber 5, whereby the placement of the sweeper section 57 is clearly illustrated. It can also be seen that the various section dividers 56 are designed to allow sufficient clearance from the perforated conveyor disk 37 for the plant material to enter the various sections of the extraction chamber 5, while the sweeping section divider 57 is positioned so that it nearly contacts the surface of the perforated conveyor disk 37, such that substantially all of the spent plant material can be removed from the surface of the perforated conveyor disk 37. The lower section dividers 56 are positioned such that they nearly contact the bottom of the perforated conveyor disk 37, so as to separate the various areas of the extraction chamber 5. Also depicted in FIG. 24 are O-ring grooves 48 to hold O-ring seals or similar sealing means. The O-rings seal against the perforated conveyor disk 37 to prevent the gas stream from attempting to pass around the edges of the perforated conveyor disk 37. An O-ring groove 48 containing an O-ring or similar seal is also included where the upper and lower sections 49, 50 contact one another to seal the extraction chamber 5 from the surrounding atmosphere and maintain a substantially closed system within the invention.

A plant dust gathering structure with an outlet 58 at the bottom of the embodiment that is similar to that which is utilized in the preceding embodiment can also be seen. The dust gathering structure is designed such that any dust that falls through the disk will slide down to the bottom of the embodiment and out the dust gathering outlet 58 where it may be collected. In some applications, it may be advantageous to separate the plant dust gathering structure into two sections such that dust collected from new plant material is collected separately from dust collected from spent plant material. As with the preceding embodiment illustrated in FIGS. 18, 19, 20, 21 and 22, this embodiment of the chamber may be designed to allow multiple successive extractions to occur simultaneously, or such that the conveyor disk is not perforated and heated gas stream is directed over the surface of the plant material rather than therethrough. It is preferred that a cleaning brush or similar device be appropriately positioned within the embodiment to free any trapped plant material from the conveyor disk 37. The location of this cleaning brush would preferably be in the upper or lower section of the extraction chamber 5 near where the spent plant material is swept from the conveyor disk.

Other Variations and Alternatives

Those of skill in the art will recognize that the illustrated and discussed embodiments of the present invention may be altered in various ways without departing from the scope of the present invention. This section will discuss some non-limiting alternatives.

Embodiments of the present invention may have quite a few components, such as heaters, sprayers, chambers, etc. These components may be combined or integrated in various ways. For example, the blower and heater could be combined in some versions, or the heater, extraction chamber and/or blower. Other combinations of components are also possible. The function of particular components may also be divided into more components. For example, FIG. 1 shows a splitter 2 that also functions as a gas/liquid separator. Alternatively, two separate components may be used. Again, this is true for other components as well.

The components of the various embodiments are shown arranged in particular relationships and in a particular order. In alternative embodiments, the order or arrangement of components may be altered. For example, the blower or gas moving device could be moved to other positions. Additionally, some components may be duplicated in additional locations. The blower could be supplemented by additional blowers or replaced by a blower in both the first and second gas stream portions 8a, 8b.

It should be noted that the various components may be referred to as "in communication with" or "connected to" other components. Both phrases are used broadly. For example, the extraction chamber 5 in FIG. 1 is in communication with and connected to the blower 1, on an upstream side, and the agglomeration chamber 10, on a downstream side, even though other components are disposed between the extraction chamber and blower or agglomeration chamber.

It should be noted that the temperature of the heated gas stream in preferred embodiments of the present invention is preferably kept below a temperature that would cause combustion of the plant material or plant oils in the extraction chamber. Put another way, the extraction process is preferably a non-combustion process. It should also be known that it is preferred that the peak temperature used for extraction and the length of time that the plant material is exposed to certain temperatures be adjusted to minimize or eliminate pyrolysis of the plant material or plant oils.

Some of the embodiments of the present invention use air as the primary gas for the gas stream, though the extraction process may introduce other components to the gas mixture. The gas stream may be at or near atmospheric pressure, above atmospheric pressure or in a state of partial vacuum. In some embodiments, the gas stream may be altered from a standard air mixture by the addition of an inert gas, a non-oxidizing gas, and/or a reducing gas. Carbon dioxide may be added in some versions. This alteration of the gas may be useful for avoiding combustion, increasing extraction, or altering the extraction process.

Any features or components of any of the embodiments discussed herein may be used in combination with features or components of other embodiments. It is the following claims, including all equivalents, which define the scope of the present invention

The invention claimed is:

1. A method to extract an oil from a plant material, comprising:
   providing a system comprising an extraction chamber and a collection chamber;
   providing a plant material comprising an oil;
   inserting the plant material into the extraction chamber;
   producing a heated gas stream in the system;
   directing the heated gas stream through the extraction chamber to convert the oil of the plant material into an extracted oil that is entrained in the heated gas stream;
   directing the extracted oil that is entrained in the heated gas stream from the extraction chamber and into the collection chamber;
   providing a collection solvent, wherein the extracted oil is soluble in the collection solvent;
   contacting the extracted oil that is entrained in the heated gas stream with the collection solvent in the collection chamber to dissolve the extracted oil in the collection solvent; and
   collecting the extracted oil.

2. The method of claim 1, in which the system comprises a gas moving device and a heater, and the method comprises:
   producing a gas stream using the gas moving device; and
   heating the gas stream using the heater to produce the heated gas stream.

3. The method of claim 2, in which the gas moving device is a blower.

4. The method of claim 1, in which the plant material is a ground plant material, and the method comprises grinding either a raw plant material or a partially-processed plant material to produce the ground plant material.

5. The method of claim 1, in which providing the plant material in the extraction chamber comprises feeding portions of the plant material into the extraction chamber from a hopper comprising the plant material.

6. The method of claim 1, in which the heated gas stream has a temperature between 100° C. and 270° C.

7. The method of claim 6, in which the heated gas stream has a pressure, and the pressure is at or near atmospheric pressure.

8. The method of claim 6, in which the heated gas stream has a pressure, and the pressure is greater than atmospheric pressure.

9. The method of claim 6, in which the heated gas stream has a pressure, and the pressure is less than atmospheric pressure.

10. The method of claim 1, comprising contacting the extracted oil that is entrained in the heated gas stream with the collection solvent within 5 seconds of inserting the plant material into the extraction chamber.

11. The method of claim 1, in which:
    the system comprises a collection solvent sprayer; and
    the method comprises contacting the extracted oil that is entrained in the heated gas stream with the collection solvent in the collection chamber by spraying the collection solvent into the collection chamber using the collection solvent sprayer.

12. The method of claim 11, comprising spraying droplets of the collection solvent that have a diameter of 1 micron to 300 microns using the collection solvent sprayer.

13. The method of claim 1, in which the collection solvent comprises ethyl alcohol.

14. The method of claim 13, in which the collection solvent comprises ethyl alcohol at a concentration of at least 40%.

15. The method of claim 1, in which the system comprises a deposit area that is separated from the external atmosphere, and the method comprises directing the plant material to the deposit area after directing the heated gas stream through the extraction chamber to convert the oil of the plant material into the extracted oil that is entrained in the heated gas stream.

16. The method of claim 1, comprising recirculating the heated gas stream from the collection chamber to the extraction chamber in a loop.

17. The method of claim 1, in which the method does not result in pyrolysis of the oil.

18. The method of claim 1, in which:
    the extracted oil that is entrained in the heated gas stream comprises a terpenoid; and
    the extracted oil that is dissolved in the collection solvent comprises the terpenoid.

19. A method to extract an oil from a plant material, comprising:
    providing a system comprising a blower, a heater, an extraction chamber, and a collection chamber;
    producing a gas stream using the blower;
    heating the gas stream using the heater to provide a heated gas stream having a temperature between 100° C. and 270° C.;
    providing a plant material comprising an oil;
    inserting the plant material into the extraction chamber;
    directing the heated gas stream through the extraction chamber to convert the oil of the plant material into an extracted oil that is entrained in the gas stream;
    directing the extracted oil that is entrained in the heated gas stream from the extraction chamber and into the collection chamber;
    providing a collection solvent, wherein the extracted oil is soluble in the collection solvent;
    contacting the extracted oil with the collection solvent in the collection chamber to dissolve the extracted oil in the collection solvent; and
    collecting the extracted oil.

20. A method to extract an oil from a plant material, comprising:
    providing a system comprising an extraction chamber, a collection chamber, and a collection solvent sprayer;
    providing a plant material comprising an oil;
    inserting the plant material into the extraction chamber;
    producing a gas stream in the system;
    directing the gas stream through the extraction chamber to convert the oil of the plant material into an extracted oil that is entrained in the gas stream;
    directing the extracted oil that is entrained in the gas stream from the extraction chamber and into the collection chamber;
    providing a collection solvent comprising ethyl alcohol, wherein the extracted oil is soluble in the collection solvent;
    spraying the extracted oil with the collection solvent in the collection chamber using the collection solvent sprayer to dissolve the extracted oil in the collection solvent; and
    collecting the extracted oil.

* * * * *